United States Patent
Park et al.

(10) Patent No.: US 12,445,627 B2
(45) Date of Patent: Oct. 14, 2025

(54) IMAGE ENCODING/DECODING METHOD AND DEVICE USING AFFINE TMVP, AND METHOD FOR TRANSMITTING BIT STREAM

(71) Applicant: LG Electronics Inc., Seoul (KR)

(72) Inventors: Nae Ri Park, Seoul (KR); Jung Hak Nam, Seoul (KR); Hyeong Moon Jang, Seoul (KR); Jaehyun Lim, Seoul (KR); Seung Hwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 744 days.

(21) Appl. No.: 17/607,231

(22) PCT Filed: May 12, 2020

(86) PCT No.: PCT/KR2020/006214
§ 371 (c)(1),
(2) Date: Oct. 28, 2021

(87) PCT Pub. No.: WO2020/231144
PCT Pub. Date: Nov. 19, 2020

(65) Prior Publication Data
US 2022/0224912 A1    Jul. 14, 2022

Related U.S. Application Data

(60) Provisional application No. 62/846,726, filed on May 12, 2019.

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS

| 2018/0098062 A1 | 4/2018 | Li et al. |
| 2018/0098063 A1 | 4/2018 | Chen et al. |

(Continued)

FOREIGN PATENT DOCUMENTS

WO    2018128379 A1    7/2018

OTHER PUBLICATIONS

Galpin, F. et al. Non CE4: Virtual Temporal Affine. JVET-K0267. Joint Video Experts Team (WET) of ITU-T SG 16 WP 3 and ISO/IEC JTC 1/SC 29/WG 11 11th Meeting: Ljubljana. Jul. 9, 2018. See pp. 1-2.

*Primary Examiner* — Jessica M Prince
(74) *Attorney, Agent, or Firm* — Bryan Cave Leighton Paisner LLP

(57) ABSTRACT

An image encoding/decoding apparatus and method are provided. An image decoding method performed by an image decoding apparatus according to the present disclosure may comprise deriving a motion shift of a current block using motion information of a neighboring block of the current block, determining a collocated block of the current block using the motion shift, deriving a motion vector for at least one control point (CP) of the determined collocated block, and deriving at least one control point motion vector (CPMV) of the current block using the motion vector for the at least one CP.

13 Claims, 28 Drawing Sheets

(51) Int. Cl.
*H04N 19/159* (2014.01)
*H04N 19/176* (2014.01)
*H04N 19/52* (2014.01)
*H04N 19/577* (2014.01)
*H04N 19/593* (2014.01)

(52) U.S. Cl.
CPC .......... *H04N 19/176* (2014.11); *H04N 19/52* (2014.11); *H04N 19/577* (2014.11); *H04N 19/593* (2014.11)

(56) References Cited

U.S. PATENT DOCUMENTS

| | | | |
|---|---|---|---|
| 2019/0028731 A1* | 1/2019 | Chuang | H04N 19/176 |
| 2019/0327482 A1* | 10/2019 | Lin | H04N 19/52 |
| 2020/0195948 A1* | 6/2020 | Li | H04N 19/176 |
| 2020/0359042 A1* | 11/2020 | Ikai | H04N 19/52 |
| 2021/0203943 A1* | 7/2021 | Lin | G06T 3/02 |

* cited by examiner

| seq_parameter_set_rbsp() { | Descriptor |
|---|---|
| ... | |
| slice_temporal_mvp_enabled_flag | u(1) |
| if( slice_temporal_mvp_enabled_flag ) | |
| sps_sbtmvp_enabled_flag | u(1) |
| ...... | |
| sps_affine_enabled_flag | u(1) |
| if( sps_affine_enabled_flag ) | |
| sps_affine_type_flag | u(1) |
| ...... | |
| } | |

(a)

| seq_parameter_set_rbsp() { | Descriptor |
|---|---|
| ...... | |
| slice_temporal_mvp_enabled_flag | u(1) |
| ...... | |
| sps_affine_enabled_flag | u(1) |
| if( sps_affine_enabled_flag ) | |
| sps_affine_type_flag | u(1) |
| ...... | |
| } | |

(b)

(a)

(b)

IMAGE ENCODING/DECODING METHOD AND DEVICE USING AFFINE TMVP, AND METHOD FOR TRANSMITTING BIT STREAM

This application is the National Stage of International Application No. PCT/KR2020/006214, filed on May 12, 2020, which claims the benefit of U.S. Provisional Application No. 62/846,726, filed on May 12, 2019, the contents of which are all hereby incorporated by reference herein in their entirety.

TECHNICAL FIELD

The present disclosure relates to an image encoding/decoding method and apparatus and a method of transmitting a bitstream, and, more particularly, to a method and apparatus for encoding/decoding an image using an affine temporal motion vector predictor (TMVP), and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide a method and apparatus for encoding/decoding an image using an affine TMVP.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

According to an image encoding/decoding method according to an aspect of the present disclosure, motion information for each pixel or subblock of a current block may be derived using an affine TMVP. When the affine TMVP is used, since a conventional affine mode and a subblock-based merge mode may be merged, it is possible to simplify an encoding/decoding process and to increase encoding efficiency.

An image decoding method according to an aspect of the present disclosure may comprise deriving a motion shift of a current block using motion information of a neighboring block of the current block, determining a collocated block of the current block using the motion shift, deriving a motion vector for at least one control point (CP) of the determined collocated block, and deriving at least one control point motion vector (CPMV) of the current block using the motion vector for the at least one CP.

In the image decoding method of the present disclosure, the neighboring block may be a left neighboring block of the current block.

The image decoding method of the present disclosure may further comprise determining whether an affine temporal motion vector predictor (TMVP) mode applies to the current block. Whether the affine TMVP mode applies to the current block may be determined based on first information specifying whether derivation of a temporal candidate is enabled with respect to the current block.

The image decoding method of the present disclosure may further comprise determining an affine model type of the affine TMVP mode when the affine TMVP mode applies to the current block. The affine model type may be determined to be one of a 4-parameter model and a 6-parameter model.

In the image decoding method of the present disclosure, when bi-prediction is performed with respect to the current block and at least one of affine model types of a first prediction direction and a second prediction direction of the bi-prediction is a 6-parameter model, the affine model type of the affine TMVP mode may be determined to be a 6-parameter model.

The image decoding method of the present disclosure may further comprise deriving an affine TMVP candidate for the current block using the derived at least one CPMV and deriving a subblock unit merge candidate list for the current block using the affine TMVP candidate.

In the image decoding method of the present disclosure, the subblock unit merge candidate list may comprise at least one of the affine TMVP candidate, an inherited affine merge candidate, a combined affine merge candidate or a zero merge candidate, and the affine TMVP candidate may be first added to the subblock unit merge candidate list.

In the image decoding method of the present disclosure, the deriving the motion vector for the at least one CP of the determined collocated block may comprise determining availability of a first CP, a second CP and a third CP of the determined collocated block and deriving a motion vector for at least one of the first CP, the second CP or the third CP based on the determination of availability.

In the image decoding method of the present disclosure, availability of the at least one CP may be determined based on whether an intra prediction mode or an intra block copy (IBC) mode applies to a block including coordinates of the at least one CP.

In the image decoding method of the present disclosure, availability of the at least one CP may be determined based on whether an intra prediction mode or an intra block copy (IBC) mode applies to a block including coordinates of the at least one CP.

In the image decoding method of the present disclosure, when one unavailable CP is present as a result of the determination of availability, a motion vector of the unavailable CP may be derived using at least one of the motion vectors of the remaining available CPs.

The image decoding method of the present disclosure may further comprise determining availability of a center position block of the determined collocated block. When the center position block is not available, the affine TMVP mode may not apply to the current block.

In the image decoding method of the present disclosure, the motion shift may be derived for each neighboring block using motion information of a plurality of neighboring blocks of the current block, the collocated block may be determined one by one for each derived motion shift, and the motion vector for the at least one CP may be derived using a CP of the determined collocated block for each motion shift.

An image decoding apparatus according to another aspect of the present disclosure may comprise a memory and at least one processor. The at least one processor may derive a motion shift of a current block using motion information of a neighboring block of the current block, determine a collocated block of the current block using the motion shift, derive a motion vector for at least one control point (CP) of the determined collocated block, and derive at least one control point motion vector (CPMV) of the current block using the motion vector for the at least one CP.

An image encoding apparatus according to another aspect of the present disclosure may comprise deriving a motion shift of a current block using motion information of a neighboring block of the current block, determining a collocated block of the current block using the motion shift, deriving a motion vector for at least one control point (CP) of the determined collocated block, and deriving at least one control point motion vector (CPMV) of the current block using the motion vector for the at least one CP.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide a method and apparatus for encoding/decoding an image using an affine TMVP.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

MODE FOR INVENTION

Figure 1:
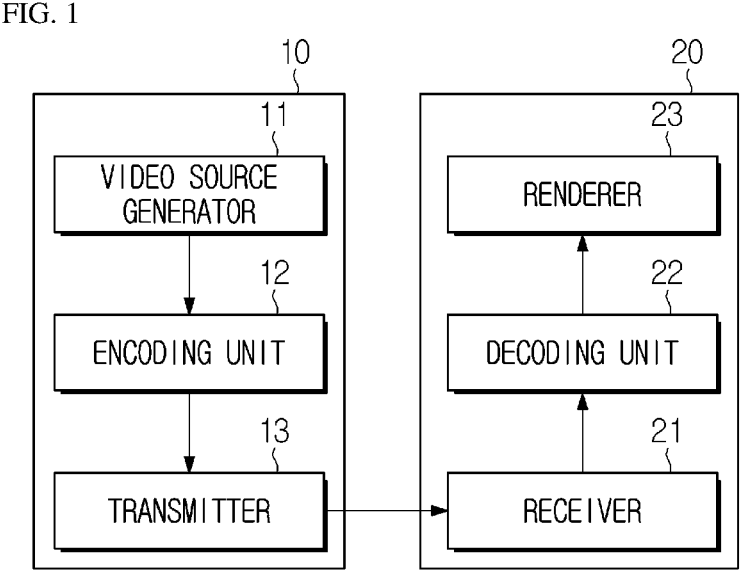
FIG. 1 is a view schematically illustrating a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pa" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
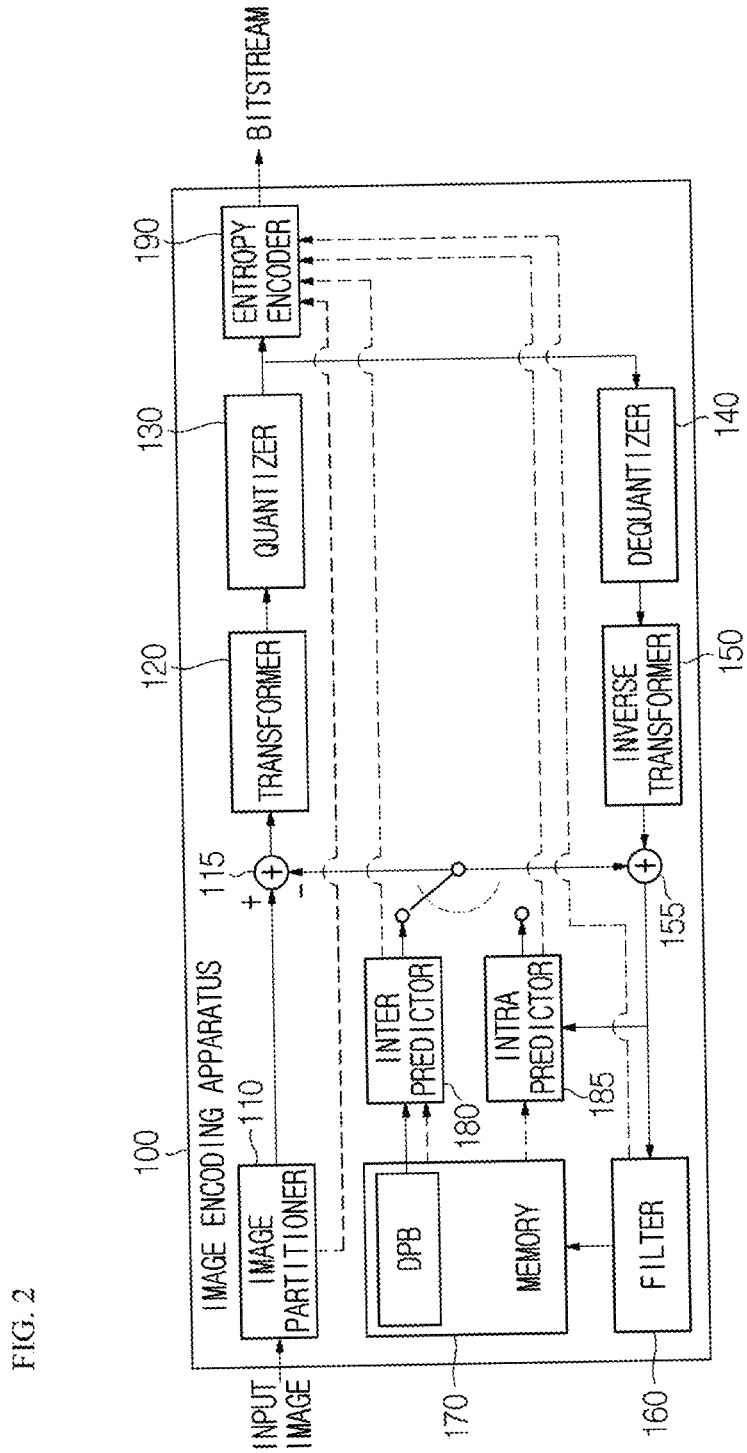
FIG. 2 is a view schematically illustrating an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, as described below, luma mapping with chroma scaling (LMCS) is applicable in a picture encoding process.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
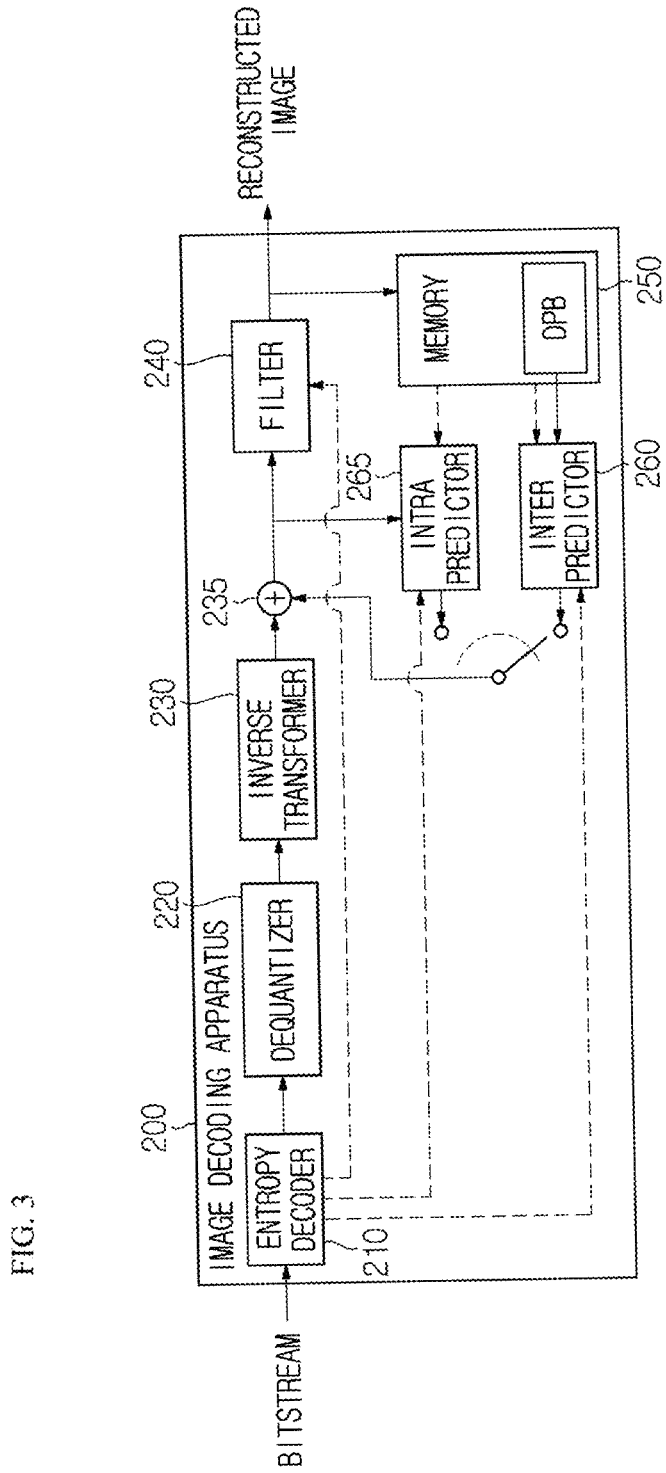
FIG. 3 is a view schematically illustrating an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). The description of the adder 155 is equally applicable to the adder 235.

Meanwhile, as described below, luma mapping with chroma scaling (LMCS) is applicable in a picture decoding process.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Inter Prediction

An image encoding apparatus/image decoding apparatus may perform inter prediction in units of blocks to derive a prediction sample. Inter prediction may mean prediction derived in a manner that is dependent on data elements of picture(s) other than a current picture. When inter prediction applies to the current block, a predicted block for the current block may be derived based on a reference block specified by a motion vector on a reference picture.

In this case, in order to reduce the amount of motion information transmitted in an inter prediction mode, motion information of the current block may be derived based on correlation of motion information between a neighboring block and the current block, and motion information may be derived in units of blocks, subblocks or samples. The motion information may include a motion vector and a reference picture index. The motion information may further include inter prediction type information. Here, the inter prediction type information may mean directional information of inter prediction. The inter prediction type information may indicate that a current block is predicted using one of L0 prediction, L1 prediction or Bi-prediction.

When applying inter prediction to the current block, the neighboring block of the current block may include a spatial neighboring block present in the current picture and a temporal neighboring block present in the reference picture. A reference picture including the reference block for the current block and a reference picture including the temporal neighboring block may be the same or different. The temporal neighboring block may be referred to as a collocated reference block or collocated CU (colCU), and the reference picture including the temporal neighboring block may be referred to as a collocated picture (colPic).

Meanwhile, a motion information candidate list may be constructed based on the neighboring blocks of the current block, and, in this case, flag or index information indicating which candidate is used may be signaled in order to derive the motion vector of the current block and/or the reference picture index.

The motion information may include L0 motion information and/or L1 motion information according to the inter prediction type. The motion vector in an L0 direction may be defined as an L0 motion vector or MVL0, and the motion vector in an L1 direction may be defined as an L1 motion vector or MVL1. Prediction based on the L0 motion vector may be defined as L0 prediction, prediction based on the L1 motion vector may be defined as L1 prediction, and prediction based both the L0 motion vector and the L1 motion vector may be defined as Bi-prediction. Here, the L0 motion vector may mean a motion vector associated with a reference picture list L0 and the L1 motion vector may mean a motion vector associated with a reference picture list L1.

The reference picture list L0 may include pictures before the current picture in output order as reference pictures, and the reference picture list L1 may include pictures after the current picture in output order. The previous pictures may be defined as forward (reference) pictures and the subsequent pictures may be defined as backward (reference) pictures. Meanwhile, the reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figure 4:
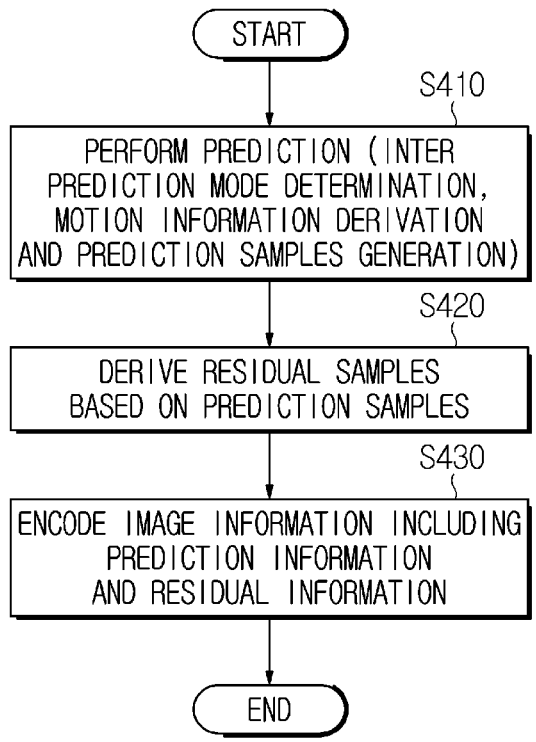
FIG. 4 is a flowchart illustrating an inter prediction based video/image encoding method.

FIG. 4 is a flowchart illustrating an inter prediction based video/image encoding method.

Figure 5:
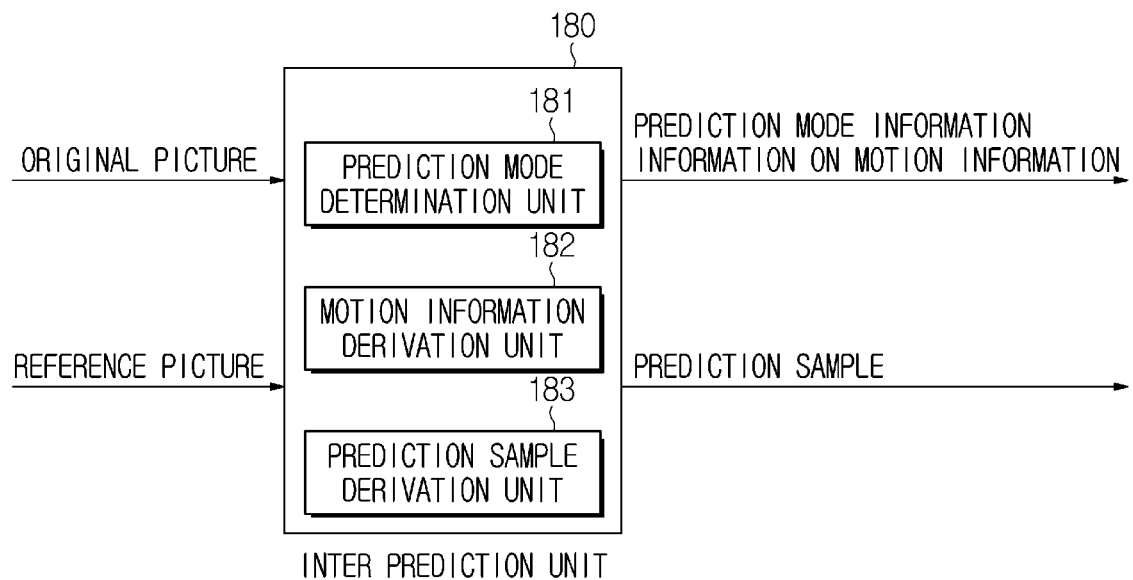
FIG. 5 is a view illustrating the configuration of an inter prediction unit 180 according to the present disclosure.

FIG. 5 is a view illustrating the configuration of an inter predictor 180 according to the present disclosure.

Figure 6:
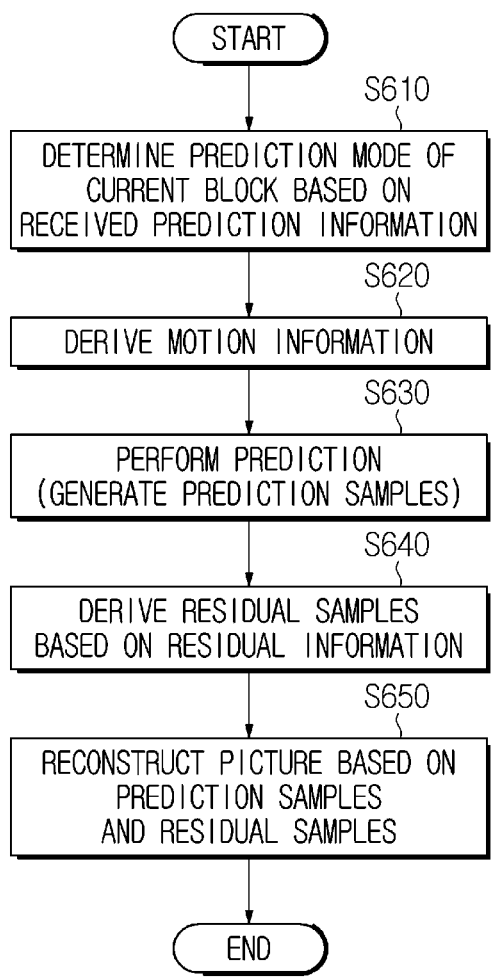
FIG. 6 is a flowchart illustrating an inter prediction based video/image decoding method.

The encoding method of FIG. 6 may be performed by the image encoding apparatus of FIG. 2. Specifically, step S410 may be performed by the inter predictor 180, and step S420 may be performed by the residual processor. Specifically, step S420 may be performed by the subtractor 115. Step S430 may be performed by the entropy encoder 190. The prediction information of step S630 may be derived by the inter predictor 180, and the residual information of step S630 may be derived by the residual processor. The residual information is information on the residual samples. The residual information may include information on quantized transform coefficients for the residual samples. As described above, the residual samples may be derived as transform coefficients through the transformer 120 of the image encoding apparatus, and the transform coefficient may be derived as quantized transform coefficients through the quantizer 130. Information on the quantized transform coefficients may be encoded by the entropy encoder 190 through a residual coding procedure.

The image encoding apparatus may perform inter prediction with respect to a current block (S410). The image encoding apparatus may derive an inter prediction mode and motion information of the current block and generate prediction samples of the current block. Here, inter prediction mode determination, motion information derivation and prediction samples generation procedures may be simultaneously performed or any one thereof may be performed before the other procedures. For example, as shown in FIG. 5, the inter prediction unit 180 of the image encoding apparatus may include a prediction mode determination unit 181, a motion information derivation unit 182 and a prediction sample derivation unit 183. The prediction mode determination unit 181 may determine the prediction mode of the current block, the motion information derivation unit 182 may derive the motion information of the current block, and the prediction sample derivation unit 183 may derive the prediction samples of the current block. For example, the inter prediction unit 180 of the image encoding apparatus may search for a block similar to the current block within a predetermined area (search area) of reference pictures through motion estimation, and derive a reference block whose difference from the current block is equal to or less than a predetermined criterion or a minimum Based on this, a reference picture index indicating a reference picture in which the reference block is located may be derived, and a motion vector may be derived based on a position difference between the reference block and the current block. The image encoding apparatus may determine a mode applying to the current block among various inter prediction modes. The image encoding apparatus may compare rate-distortion (RD) costs for the various prediction modes and determine an optimal inter prediction mode of the current block. However, the method of determining the inter prediction mode of the current block by the image encoding apparatus is not limited to the above example, and various methods may be used.

For example, the inter prediction mode of the current block may be determined to be at least one of a merge mode, a merge skip mode, a motion vector prediction (MVP) mode, a symmetric motion vector difference (SMVD) mode, an affine mode, a subblock-based merge mode, an adaptive motion vector resolution (AMVR) mode, a history-based motion vector predictor (HMVP) mode, a pair-wise average merge mode, a merge mode with motion vector differences (MMVD) mode, a decoder side motion vector refinement (DMVR) mode, a combined inter and intra prediction (CIIP) mode or a geometric partitioning mode (GPM).

For example, when a skip mode or a merge mode applies to the current block, the image encoding apparatus may derive merge candidates from neighboring blocks of the current block and construct a merge candidate list using the derived merge candidates. In addition, the image encoding apparatus may derive a reference block whose difference from the current block is equal to or less than a predetermined criterion or a minimum, among reference blocks indicated by merge candidates included in the merge candidate list. In this case, a merge candidate associated with the derived reference block may be selected, and merge index information indicating the selected merge candidate may be generated and signaled to an image decoding apparatus. The motion information of the current block may be derived using the motion information of the selected merge candidate.

As another example, when an MVP mode applies to the current block, the image encoding apparatus may derive motion vector predictor (MVP) candidates from the neighboring blocks of the current block and construct an MVP candidate list using the derived MVP candidates. In addition, the image encoding apparatus may use the motion vector of the MVP candidate selected from among the MVP candidates included in the MVP candidate list as the MVP of the current block. In this case, for example, the motion vector indicating the reference block derived by the above-described motion estimation may be used as the motion vector of the current block, an MVP candidate with a motion vector having a smallest difference from the motion vector of the current block among the MVP candidates may be the selected MVP candidate. A motion vector difference (MVD) which is a difference obtained by subtracting the MVP from the motion vector of the current block may be derived. In this case, index information indicating the selected MVP candidate and information on the MVD may be signaled to the image decoding apparatus. In addition, when applying the MVP mode, the value of the reference picture index may be constructed as reference picture index information and separately signaled to the image decoding apparatus.

The image encoding apparatus may derive residual samples based on the prediction samples (S420). The image encoding apparatus may derive the residual samples through comparison between original samples of the current block and the prediction samples. For example, the residual sample may be derived by subtracting a corresponding prediction sample from an original sample.

The image encoding apparatus may encode image information including prediction information and residual information (S430). The image encoding apparatus may output the encoded image information in the form of a bitstream. The prediction information may include prediction mode information (e.g., skip flag, merge flag or mode index, etc.) and information on motion information as information related to the prediction procedure. Among the prediction mode information, the skip flag indicates whether a skip mode applies to the current block, and the merge flag indicates whether the merge mode applies to the current block. Alternatively, the prediction mode information may indicate one of a plurality of prediction modes, such as a mode index. When the skip flag and the merge flag are 0, it may be determined that the MVP mode applies to the current block. The information on the motion information may include candidate selection information (e.g., merge index, mvp flag or mvp index) which is information for deriving a motion vector. Among the candidate selection information, the merge index may be signaled when the merge mode applies to the current block and may be information for selecting one of merge candidates included in a merge candidate list. Among the candidate selection information, the MVP flag or the MVP index may be signaled when the MVP mode applies to the current block and may be information for selecting one of MVP candidates in an MVP candidate list. Specifically, the MVP flag may be signaled using a syntax element mvp_10_flag or mvp_11_flag. In addition, the information on the motion information may include information on the above-described MVD and/or reference picture index information. In addition, the information on the motion information may include information indicating whether to apply L0 prediction, L1 prediction or Bi-prediction. The residual information is information on the residual samples. The residual information may include information on quantized transform coefficients for the residual samples.

The output bitstream may be stored in a (digital) storage medium and transmitted to the image decoding apparatus or may be transmitted to the image decoding apparatus via a network.

As described above, the image encoding apparatus may generate a reconstructed picture (a picture including reconstructed samples and a reconstructed block) based on the reference samples and the residual samples. This is for the image encoding apparatus to derive the same prediction result as that performed by the image decoding apparatus, thereby increasing coding efficiency. Accordingly, the image encoding apparatus may store the reconstructed picture (or the reconstructed samples and the reconstructed block) in a memory and use the same as a reference picture for inter prediction. As described above, an in-loop filtering procedure is further applicable to the reconstructed picture.

FIG. 6 is a flowchart illustrating an inter prediction based video/image decoding method.

Figure 7:
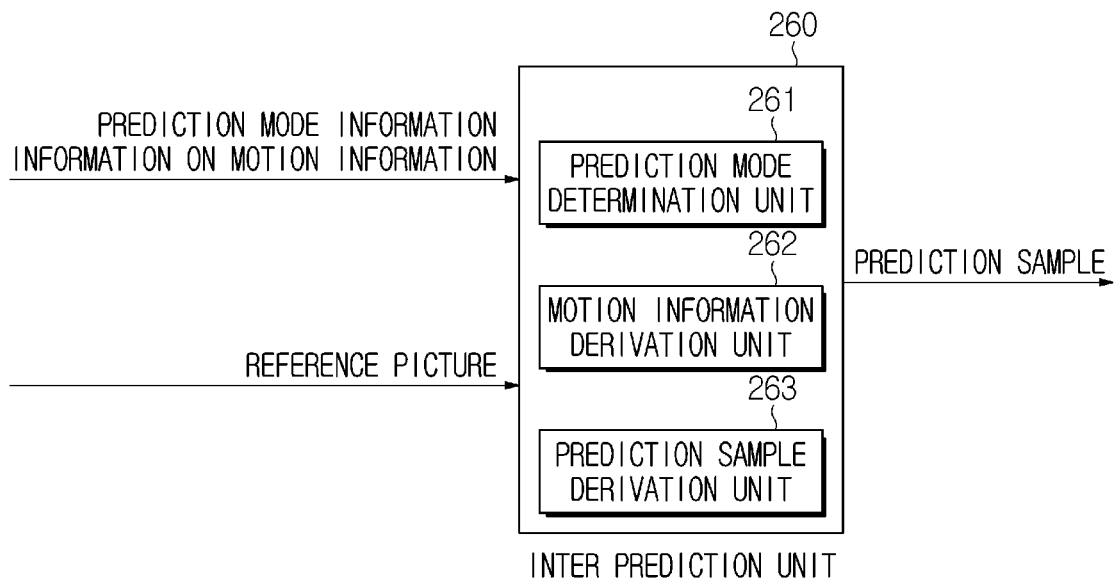
FIG. 7 is a view illustrating the configuration of an inter prediction unit 260 according to the present disclosure.

FIG. 7 is a view illustrating the configuration of an inter prediction unit 260 according to the present disclosure.

The image decoding apparatus may perform operation corresponding to operation performed by the image encoding apparatus. The image decoding apparatus may perform prediction with respect to a current block based on received prediction information and derive prediction samples.

The decoding method of FIG. 6 may be performed by the image decoding apparatus of FIG. 3. Steps S610 to S630 may be performed by the inter prediction unit 260, and the prediction information of step S610 and the residual information of step S640 may be obtained from a bitstream by the entropy decoder 210. The residual processor of the image decoding apparatus may derive residual samples for a current block based on the residual information (S640). Specifically, the dequantizer 220 of the residual processor may perform dequantization based on quantized transform coefficients derived based on the residual information to derive transform coefficients, and the inverse transformer 230 of the residual processor may perform inverse transform with respect to the transform coefficients to derive the residual samples for the current block. Step S650 may be performed by the adder 235 or the reconstructor.

Specifically, the image decoding apparatus may determine the prediction mode of the current block based on the received prediction information (S610). The image decoding apparatus may determine which inter prediction mode applies to the current block based on the prediction mode information in the prediction information.

For example, it may be determined whether the skip mode applies to the current block based on the skip flag. In addition, it may be determined whether the merge mode or the MVP mode applies to the current block based on the merge flag. Alternatively, one of various inter prediction mode candidates may be selected based on the mode index. The inter prediction mode candidates may include a skip mode, a merge mode and/or an MVP mode or may include various inter prediction modes which will be described below.

The image decoding apparatus may derive the motion information of the current block based on the determined inter prediction mode (S620). For example, when the skip mode or the merge mode applies to the current block, the image decoding apparatus may construct a merge candidate list, which will be described below, and select one of merge candidates included in the merge candidate list. The selection may be performed based on the above-described candidate selection information (merge index). The motion information of the current block may be derived using the motion information of the selected merge candidate. For example, the motion information of the selected merge candidate may be used as the motion information of the current block.

As another example, when the MVP mode applies to the current block, the image decoding apparatus may construct an MVP candidate list and use the motion vector of an MVP candidate selected from among MVP candidates included in the MVP candidate list as an MVP of the current block. The selection may be performed based on the above-described candidate selection information (mvp flag or mvp index). In this case, the MVD of the current block may be derived based on information on the MVD, and the motion vector of the current block may be derived based on MVP and MVD of the current block. In addition, the reference picture index of the current block may be derived based on the reference picture index information. A picture indicated by the reference picture index in the reference picture list of the current block may be derived as a reference picture referenced for inter prediction of the current block.

The image decoding apparatus may generate prediction samples of the current block based on motion information of the current block (S630). In this case, the reference picture may be derived based on the reference picture index of the current block, and the prediction samples of the current block may be derived using the samples of the reference block indicated by the motion vector of the current block on the reference picture. In some cases, a prediction sample filtering procedure may be further performed with respect to all or some of the prediction samples of the current block.

For example, as shown in FIG. 7, the inter prediction unit 260 of the image decoding apparatus may include a prediction mode determination unit 261, a motion information derivation unit 262 and a prediction sample derivation unit 263. In the inter prediction unit 260 of the image decoding apparatus, the prediction mode determination unit 261 may determine the prediction mode of the current block based on the received prediction mode information, the motion information derivation unit 262 may derive the motion information (a motion vector and/or a reference picture index, etc.) of the current block based on the received motion information, and the prediction sample derivation unit 263 may derive the prediction samples of the current block.

The image decoding apparatus may generate residual samples of the current block based the received residual information (S640). The image decoding apparatus may generate the reconstructed samples of the current block based on the prediction samples and the residual samples and generate a reconstructed picture based on this (S650). Thereafter, an in-loop filtering procedure is applicable to the reconstructed picture as described above.

As described above, the inter prediction procedure may include step of determining an inter prediction mode, step of deriving motion information according to the determined prediction mode, and step of performing prediction (generating prediction samples) based on the derived motion information. The inter prediction procedure may be performed by the image encoding apparatus and the image decoding apparatus, as described above.

Hereinafter, the step of deriving the motion information according to the prediction mode will be described in greater detail.

As described above, inter prediction may be performed using motion information of a current block. An image encoding apparatus may derive optimal motion information of a current block through a motion estimation procedure. For example, the image encoding apparatus may search for a similar reference block with high correlation within a predetermined search range in the reference picture using an original block in an original picture for the current block in fractional pixel unit, and derive motion information using the same. Similarity of the block may be calculated based on a sum of absolute differences (SAD) between the current block and the reference block. In this case, motion information may be derived based on a reference block with a smallest SAD in the search area. The derived motion information may be signaled to an image decoding apparatus according to various methods based on an inter prediction mode.

When a merge mode applies to a current block, motion information of the current block is not directly transmitted and motion information of the current block is derived using motion information of a neighboring block. Accordingly, motion information of a current prediction block may be indicated by transmitting flag information indicating that the merge mode is used and candidate selection information (e.g., a merge index) indicating which neighboring block is used as a merge candidate. In the present disclosure, since the current block is a unit of prediction performance, the current block may be used as the same meaning as the current prediction block, and the neighboring block may be used as the same meaning as a neighboring prediction block.

The image encoding apparatus may search for merge candidate blocks used to derive the motion information of the current block to perform the merge mode. For example, up to five merge candidate blocks may be used, without being limited thereto. The maximum number of merge candidate blocks may be transmitted in a slice header or a tile group header, without being limited thereto. After finding the merge candidate blocks, the image encoding apparatus may generate a merge candidate list and select a merge candidate block with smallest RD cost as a final merge candidate block.

The present disclosure provides various embodiments for the merge candidate blocks configuring the merge candidate list. The merge candidate list may use, for example, five merge candidate blocks. For example, four spatial merge candidates and one temporal merge candidate may be used.

Figure 8:
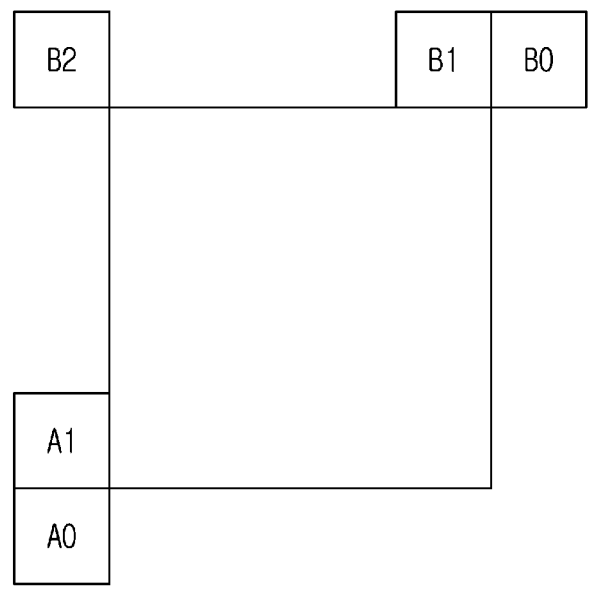
FIG. 8 is a view illustrating neighboring blocks available as a spatial merge candidate.

FIG. 8 is a view illustrating neighboring blocks available as a spatial merge candidate.

Figure 9:
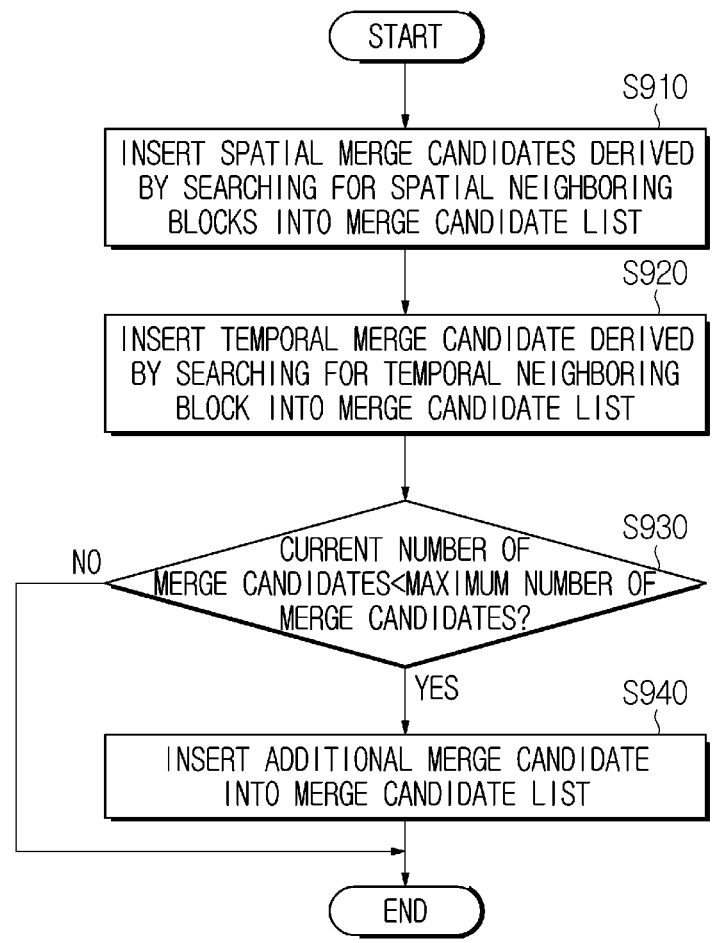
FIG. 9 is a view schematically illustrating a merge candidate list construction method according to an example of the present disclosure.

FIG. 9 is a view schematically illustrating a merge candidate list construction method according to an example of the present disclosure.

An image encoding/decoding apparatus may insert, into a merge candidate list, spatial merge candidates derived by searching for spatial neighboring blocks of a current block (S910). For example, as shown in FIG. 8, the spatial neighboring blocks may include a bottom-left corner neighboring block $A_0$, a left neighboring block $A_1$, a top-right corner neighboring block $B_0$, a top neighboring block $B_1$, and a top-left corner neighboring block $B_2$ of the current block. However, this is an example and, in addition to the above-described spatial neighboring blocks, additional neighboring blocks such as a right neighboring block, a bottom neighboring block and a bottom-right neighboring block may be further used as the spatial neighboring blocks. The image encoding/decoding apparatus may detect available blocks by searching for the spatial neighboring blocks based on priority and derive motion information of the detected blocks as the spatial merge candidates. For example, the image encoding/decoding apparatus may construct a merge candidate list by searching for the five blocks shown in FIG. 10 in order of $A_1$, $B_1$, $B_0$, $A_0$ and $B_2$ and sequentially indexing available candidates.

The image encoding/decoding apparatus may insert, into the merge candidate list, a temporal merge candidate derived by searching for temporal neighboring blocks of the current block (S920). The temporal neighboring blocks may be located on a reference picture which is different from a current picture in which the current block is located. A reference picture in which the temporal neighboring block is located may be referred to as a collocated picture or a col picture. The temporal neighboring block may be searched for in order of a bottom-right corner neighboring block and a bottom-right center block of the co-located block for the current block on the col picture. Meanwhile, when applying motion data compression in order to reduce memory load, specific motion information may be stored as representative motion information for each predetermined storage unit for the col picture. In this case, motion information of all blocks in the predetermined storage unit does not need to be stored, thereby obtaining motion data compression effect. In this case, the predetermined storage unit may be predetermined as, for example, 16×16 sample unit or 8×8 sample unit or size information of the predetermined storage unit may be signaled from the image encoding apparatus to the image decoding apparatus. When applying the motion data compression, the motion information of the temporal neighboring block may be replaced with the representative motion information of the predetermined storage unit in which the temporal neighboring block is located. That is, in this case, from the viewpoint of implementation, the temporal merge candidate may be derived based on the motion information of a prediction block covering an arithmetic left-shifted position after an arithmetic right shift by a predetermined value based on coordinates (top-left sample position) of the temporal neighboring block, not a prediction block located on the coordinates of the temporal neighboring block. For example, when the predetermined storage unit is a 2$^n$×2$^n$ sample unit and the coordinates of the temporal neighboring block are (xTnb, yTnb), the motion information of a prediction block located at a modified position ((xTnb>>n)<<n), (yTnb>>n)<<n)) may be used for the temporal merge candidate. Specifically, for example, when the predetermined storage unit is a 16×16 sample unit and the coordinates of the temporal neighboring block are (xTnb, yTnb), the motion information of a prediction block located at a modified position ((xTnb>>4)<<4), (yTnb>>4)<<4)) may be used for the temporal merge candidate. Alternatively, for example, when the predetermined storage unit is an 8×8 sample unit and the coordinates of the temporal neighboring block are (xTnb, yTnb), the motion information of a prediction block located at a modified position ((xTnb>>3)<<3), (yTnb>>3)<<3)) may be used for the temporal merge candidate.

Referring to FIG. 9 again, the image encoding/decoding apparatus may check whether the current number of merge candidates is less than a maximum number of merge candidates (S930). The maximum number of merge candidates may be predefined or signaled from the image encoding apparatus to the image decoding apparatus. For example, the image encoding apparatus may generate and encode information on the maximum number of merge candidates and transmit the encoded information to the image decoding apparatus in the form of a bitstream. When the maximum number of merge candidates is satisfied, a subsequent candidate addition process S940 may not be performed.

When the current number of merge candidates is less than the maximum number of merge candidates as a checked result of step S930, the image encoding/decoding apparatus may derive an additional merge candidate according to a predetermined method and then insert the additional merge candidate to the merge candidate list (S940).

When the current number of merge candidates is not less than the maximum number of merge candidates as a checked result of step S930, the image encoding/decoding apparatus may end the construction of the merge candidate list. In this case, the image encoding apparatus may select an optimal merge candidate from among the merge candidates configuring the merge candidate list, and signal candidate selection information (e.g., merge index) indicating the selected merge candidate to the image decoding apparatus. The image decoding apparatus may select the optimal merge candidate based on the merge candidate list and the candidate selection information.

The motion information of the selected merge candidate may be used as the motion information of the current block, and the prediction samples of the current block may be derived based on the motion information of the current block, as described above. The image encoding apparatus may derive the residual samples of the current block based on the prediction samples and signal residual information of the residual samples to the image decoding apparatus. The image decoding apparatus may generate reconstructed samples based on the residual samples derived based on the residual information and the prediction samples and generate the reconstructed picture based on the same, as described above.

When applying a skip mode to the current block, the motion information of the current block may be derived using the same method as the case of applying the merge mode. However, when applying the skip mode, a residual signal for a corresponding block is omitted and thus the prediction samples may be directly used as the reconstructed samples.

When applying an MVP mode to the current block, a motion vector predictor (mvp) candidate list may be generated using a motion vector of reconstructed spatial neighboring blocks (e.g., the neighboring blocks shown in FIG. 10) and/or a motion vector corresponding to the temporal neighboring blocks (or Col blocks). That is, the motion vector of the reconstructed spatial neighboring blocks and the motion vector corresponding to the temporal neighboring blocks may be used as motion vector predictor candidates of the current block. When applying bi-prediction, an mvp candidate list for L0 motion information derivation and an mvp candidate list for L1 motion information derivation are individually generated and used. Prediction information (or information on prediction) of the current block may include candidate selection information (e.g., an MVP flag or an MVP index) indicating an optimal motion vector predictor candidate selected from among the motion vector predictor candidates included in the mvp candidate list. In this case, a prediction unit may select a motion vector predictor of a current block from among the motion vector predictor candidates included in the mvp candidate list using the candidate selection information. The prediction unit of the image encoding apparatus may obtain and encode a motion vector difference (MVD) between the motion vector of the current block and the motion vector predictor and output the encoded MVD in the form of a bitstream. That is, the MVD may be obtained by subtracting the motion vector predictor from the motion vector of the current block. The prediction unit of the image decoding apparatus may obtain a motion vector difference included in the information on prediction and derive the motion vector of the current block through addition of the motion vector difference and the motion vector predictor. The prediction unit of the image encoding apparatus may obtain or derive a reference picture index indicating a reference picture from the information on prediction.

Figure 10:
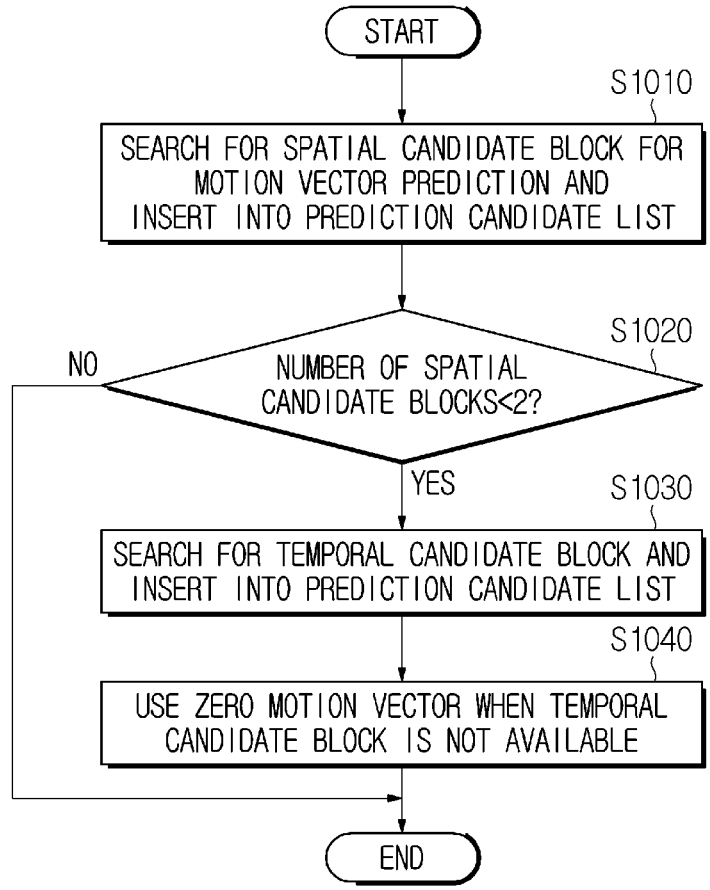
FIG. 10 is a view schematically illustrating a motion vector predictor candidate list construction method according to an example of the present disclosure.

FIG. 10 is a view schematically illustrating a motion vector predictor candidate list construction method according to an example of the present disclosure.

First, a spatial candidate block of a current block may be searched for and available candidate blocks may be inserted into an MVP candidate list (S1010). Thereafter, it is determined whether the number of MVP candidates included in the MVP candidate list is less than 2 (S1020) and, when the number of MVP candidates is two, construction of the MVP candidate list may be completed.

In step S1020, when the number of available spatial candidate blocks is less than 2, a temporal candidate block of the current block may be searched for and available candidate blocks may be inserted into the MVP candidate list (S1030). When the temporal candidate blocks are not available, a zero motion vector may be inserted into the MVP candidate list (S1040), thereby completing construction of the MVP candidate list.

Meanwhile, when applying an mvp mode, a reference picture index may be explicitly signaled. In this case, a reference picture index refidxL0 for L0 prediction and a reference picture index refidxL1 for L1 prediction may be distinguishably signaled. For example, when applying the MVP mode and applying Bi-prediction, both information on refidxL0 and information on refidxL1 may be signaled.

As described above, when applying the MVP mode, information on MVP derived by the image encoding apparatus may be signaled to the image decoding apparatus. Information on the MVD may include, for example, an MVD absolute value and information indicating x and y components for a sign. In this case, when the MVD absolute value is greater than 0, whether the MVD absolute value is greater than 1 and information indicating an MVD remainder may be signaled stepwise. For example, information indicating whether the MVD absolute value is greater than 1 may be signaled only when a value of flag information indicating whether the MVD absolute value is greater than 0 is 1.

Overview of Affine Mode

Hereinafter, an affine mode which is an example of an inter prediction mode will be described in detail. In a conventional video encoding/decoding system, only one motion vector is used to express motion information of a current block. However, in this method, there is a problem in that optimal motion information is only expressed in units of blocks, but optimal motion information cannot be expressed in units of pixels. In order to solve this problem, an affine mode defining motion information of a block in units of pixels has been proposed. According to the affine mode, a motion vector for each pixel and/or subblock unit of a block may be determined using two to four motion vectors associated with a current block.

Compared to the existing motion information expressed using translation motion (or displacement) of a pixel value, in the affine mode, motion information for each pixel may be expressed using at least one of translation motion, scaling, rotation or shear. Among them, an affine mode in which motion information for each pixel is expressed using displacement, scaling or rotation may be similarity or simplified affine mode. The affine mode in the following description may mean a similarity or simplified affine mode.

Motion information in the affine mode may be expressed using two or more control point motion vectors (CPMVs). A method vector of a specific pixel position of a current block may be derived using a CPMV. In this case, a set of motion vectors for each pixel and/or subblock of a current block may be defined as an affine motion vector field (affine MVF).

Figure 11:
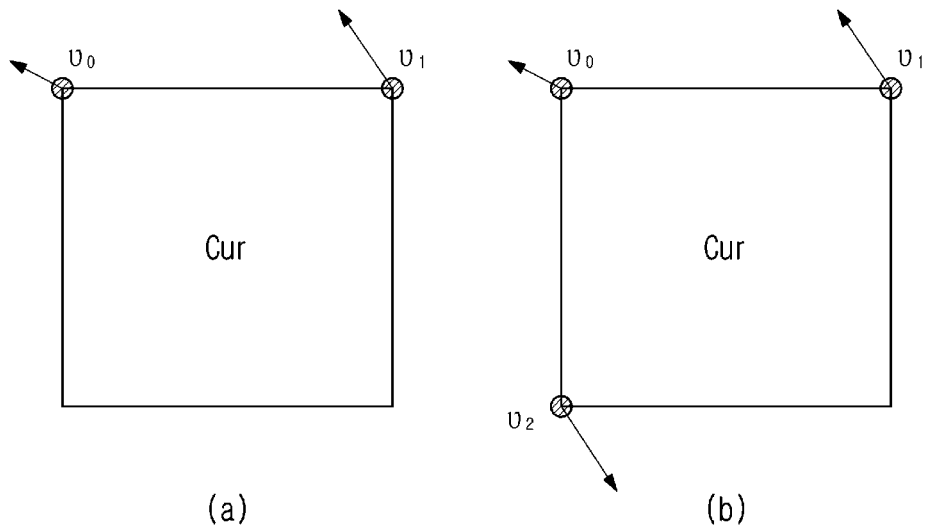
FIG. 11 is a view illustrating a parameter model of an affine mode.

FIG. 11 is a view illustrating a parameter model of an affine mode.

When an affine mode applies to a current block, an affine MVF may be derived using one of a 4-parameter model and a 6-parameter model. In this case, the 4-parameter model may mean a model type in which two CPMVs are used and the 6-parameter model may mean a model type in which three CPMVs are used. FIGS. 11(a) and 11(b) show CPMVs used in the 4-parameter model and the 6-parameter model, respectively.

When the position of the current block is (x, y), a motion vector according to the pixel position may be derived according to Equation 1 or 2 below. For example, the motion vector according to the 4-parameter model may be derived according to Equation 1 and the motion vector according to the 6-parameter model may be derived according to Equation 2.

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1x} - mv_{0x}}{W}y + mv_{0y} \end{cases} \quad \text{[Equation 1]}$$

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{[Equation 2]}$$

In Equations 1 and 2, mv0={mv_0x, mv_0y} may be a CPMV at the top left corner position of the current block, v1={mv_1x, mv_1y} may be a CPMV at the top right position of the current block, and mv2={mv_2x, mv_2y} may be a CPMV at the bottom left position of the current block. In this case, W and H respectively correspond to the width and height of the current block, and mv={mv_x, mv_y} may mean a motion vector of a pixel position {x, y}.

In an encoding/decoding process, an affine MVF may be determined in units of pixels and/or predefined subblocks. When the affine MVF is determined in units of pixels, a motion vector may be derived based on each pixel value. Meanwhile, when the affine MVF is determined in units of subblocks, a motion vector of a corresponding block may be derived based on a center pixel value of a subblock. The center pixel value may mean a virtual pixel present in the center of a subblock or a bottom right pixel among four pixels present in the center. In addition, the center pixel value may be a specific pixel in a subblock and may be a pixel representing a corresponding subblock.

The affine mode may be divided into detailed modes according to a method of encoding/decoding motion information. For example, the affine mode may be subdivided into an affine MVP mode and an affine merge mode.

When an affine merge mode applies to a current block, a CPMV may be derived from neighboring blocks of the current block encoded/decoded in the affine mode. When at least one of the neighboring blocks of the current block is encoded/decoded in the affine mode, the affine merge mode may apply to the current block. That is, when the affine merge mode applies to the current block, CPMVs of the current block may be derived using CPMVs of the neighboring blocks. For example, the CPMVs of the neighboring blocks may be determined to be the CPMVs of the current block or the CPMV of the current block may be derived based on the CPMVs of the neighboring blocks. When the CPMV of the current block is derived based on the CPMVs of the neighboring blocks, at least one of coding parameters of the current block or the neighboring blocks may be used.

For example, an affine mode flag specifying whether an affine mode is applicable to a current block may be defined, which may be signaled at at least one of higher levels of the current block, such as a sequence, a picture, a slice, a tile, a tile group, a brick, etc. For example, the affine mode flag may be named sps_affine_enabled_flag.

When the affine merge mode applies, an affine merge candidate list may be configured to derive the CPMV of the current block. In this case, the affine merge candidate list may include at least one of an inherited affine merge candidate, a combined affine merge candidate or a zero merge candidate. The inherited affine merge candidate may mean a candidate derived using the CPMVs of the neighboring blocks when the neighboring blocks of the current block are encoded/decoded in the affine mode. The combined affine merge candidate may mean a candidate having each CPMV derived based on motion vectors of neighboring blocks of each control point (CP). Meanwhile, the zero merge candidate may mean a candidate composed of CPMVs having a size of 0. In the following description, the CP may mean a specific position of a block used to derive a CPMV. For example, the CP may be each vertex position of a block.

Figure 12:
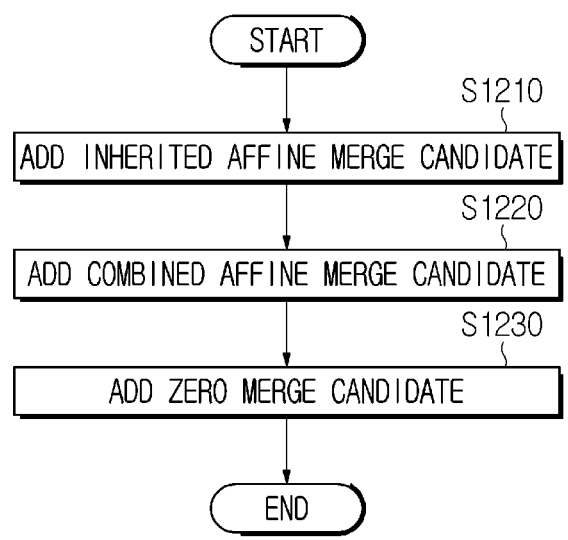
FIG. 12 is a view illustrating a method of generating an affine merge candidate list.

FIG. 12 is a view illustrating a method of generating an affine merge candidate list.

Referring to the flowchart of FIG. 12, affine merge candidates may be added to the affine merge candidate list in order of an inherited affine merge candidate (S1210), a combined affine merge candidate (S1220) and a zero merge candidate (S1230). The zero merge candidate may be added when the number of candidates included in the candidate list does not satisfy a maximum number of candidates even though all the inherited affine merge candidates and the combined affine merge candidates are added to the affine merge candidate list. In this case, the zero merge candidate may be added until the number of candidates of the affine merge candidate list satisfies the maximum number of candidates.

Figure 13:
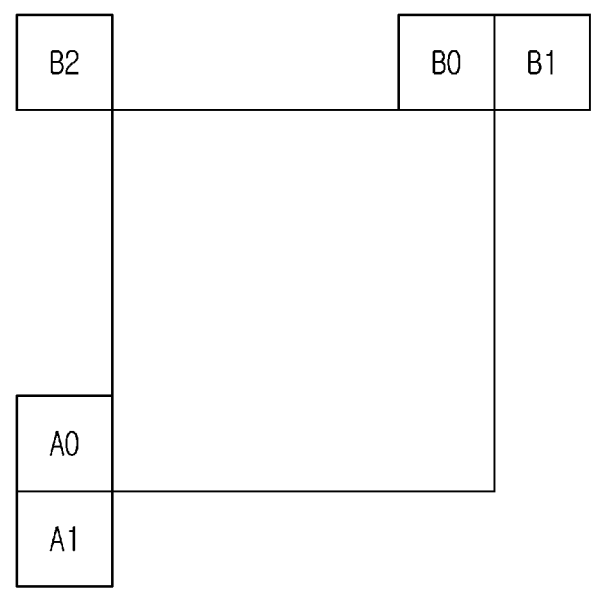
FIG. 13 is a view illustrating neighboring blocks for deriving an inherited affine candidate.
Figure 14:
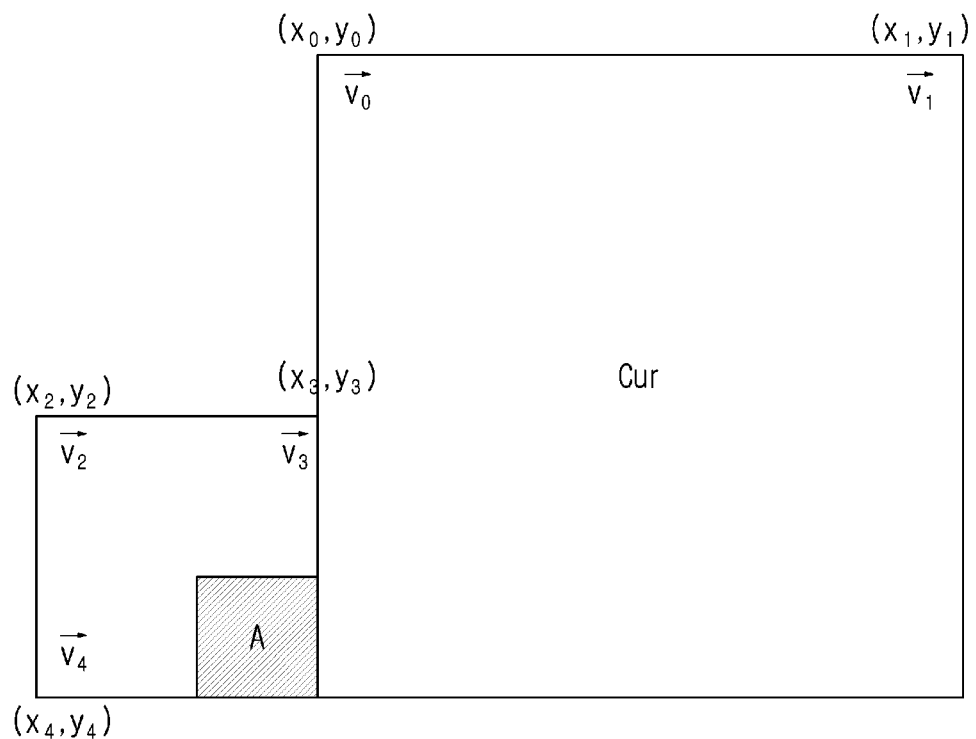
FIG. 14 is a view illustrating a control point motion vector (CPMV) derived from a neighboring block.

FIG. 13 is a view illustrating neighboring blocks for deriving an inherited affine candidate, and FIG. 14 is a view illustrating a control point motion vector (CPMV) derived from a neighboring block.

For example, a maximum of two inherited affine merge candidates may be derived, each of which may be derived based on at least one of left neighboring blocks and top neighboring blocks. FIG. 13 shows neighboring blocks for deriving the inherited affine merge mode. An inherited affine merge candidate derived based on a left neighboring block is derived based on at least one of A0 or A1, and an inherited affine merge candidate derived based on a top neighboring block may be derived based on at least one of B0, B1 or B2. In this case, the scan order of the neighboring blocks may be A0 to A1 and B0, B1 and B2, but is not limited thereto. In this case, redundancy check may not be performed between candidates derived from the left neighboring block and the top neighboring block.

For example, as shown in FIG. 14, when a left neighboring block A is encoded/decoded in the affine mode, at least one of motion vectors v2, v3 and v4 corresponding to the CP of the neighboring block A may be derived. When the neighboring block A is encoded/decoded through a 4-parameter affine model, the inherited affine merge candidate may be derived using v2 and v3. In contrast, When the neighboring block A is encoded/decoded through a 6-parameter affine model, the inherited affine merge candidate may be derived using v2, v3 and v4.

Figure 15:
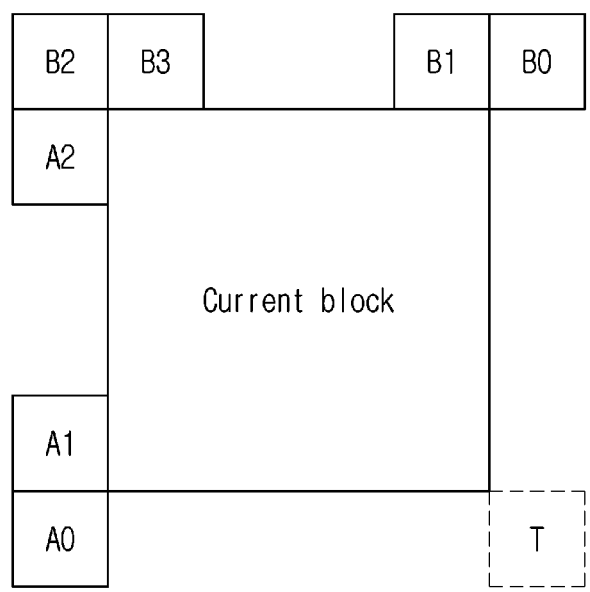
FIG. 15 is a view illustrating neighboring blocks for deriving a combined affine merge candidate.

FIG. 15 is a view illustrating neighboring blocks for deriving a combined affine merge candidate.

The combined affine candidate may mean a candidate having a CPMV derived using a combination of general motion information of neighboring blocks. Motion information for each CP may be derived using spatial neighboring blocks or temporal neighboring blocks of the current block. In the following description, CPMVk may mean a motion vector representing a k-th CP. For example, referring to FIG. 15, CPMV1 may be determined to be one of motion vectors of B2, B3 and A2, and, in this case, the scan order may be B2, B3 and A2. CPMV2 may be determined to be one of motion vectors of B1 and B0, and, in this case, the scan order may be B1 and B0. CPMV3 may be determined to be one of motion vectors of A1 and A0, and, in this case, the scan order may be A1 and A0. When TMVP is applicable to the current block, CPMV4 may be determined as a motion vector of T which is a temporal neighboring block.

After four motion vectors for each CP are derived, a combined affine merge candidate may be derived based on this. The combined affine merge candidate may be configured by including at least two motion vectors selected from among the derived four motion vectors for each CP. For example, the combined affine merge candidate may be composed of at least one of {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2} or {CPMV1, CPMV3}. A combined affine candidate composed of three motion vectors may be a candidate for a 6-parameter affine model. In contrast, a combined affine candidate composed of two motion vectors may be a candidate for a 4-parameter affine model.

When an affine MVP mode applies to a current block, an encoding/decoding apparatus may derive two or more CPMV predictors and CPMVs for the current block and derive CPMV differences based on them. In this case, the CPMV differences may be signaled from the encoding apparatus to the decoding apparatus.

Meanwhile, only when the affine merge mode or a subblock-based TMVP does not apply to the current block, an affine MVP mode may apply to the current block. Meanwhile, the affine MVP mode may be expressed as an affine CP MVP mode.

When the affine MVP applies to the current block, an affine MVP candidate list may be configured to derive a CPMV for the current block. In this case, the affine MVP candidate list may include at least one of an inherited affine MVP candidate, a combined affine MVP candidate, a translation motion affine MVP candidate or a zero MVP candidate.

In this case, the inherited affine MVP candidate may mean a candidate derived based on the CPMVs of the neighboring blocks, when the neighboring blocks of the current block are encoded/decoded in an affine mode. The combined affine MVP candidate may mean a candidate derived by generating a CPMV combination based on a motion vector of a CP neighboring block. The zero MVP candidate may mean a candidate composed of CPMVs having a value of 0. The derivation method and characteristics of the inherited affine MVP candidate and the combined affine MVP candidate are the same as the above-described inherited affine candidate and the combined affine candidate and thus a description thereof will be omitted.

When the maximum number of candidates of the affine MVP candidate list is 2, the combined affine MVP candidate, the translation motion affine MVP candidate and the zero MVP candidate may be added when the current number of candidates is less than 2. In particular, the translation motion affine MVP candidate may be derived in the following order.

For example, when the number of candidates included in the affine MVP candidate list is less than 2 and CPMV0 of the combined affine MVP candidate is valid, CPMV0 may be used as an affine MVP candidate. That is, affine MVP candidates having all motion vectors of CP0, CP1, CP2 being CPMV0 may be added to the affine MVP candidate list.

Next, when the number of candidates of the affine MVP candidate list is less than 2 and CPMV1 of the combined affine MVP candidate is valid, CPMV1 may be used as an affine MVP candidate. That is, affine MVP candidates having all motion vectors of CP0, CP1, CP2 being CPMV1 may be added to the affine MVP candidate list.

Next, when the number of candidates of the affine MVP candidate list is less than 2 and CPMV2 of the combined affine MVP candidate is valid, CPMV2 may be used as an affine MVP candidate. That is, affine MVP candidates having all motion vectors of CP0, CP1, CP2 being CPMV2 may be added to the affine MVP candidate list.

Despite the above-described conditions, when the number of candidates of the affine MVP candidate list is less than 2, a temporal motion vector predictor (TMVP) of the current block may be added to the affine MVP candidate list.

Despite addition of the translation motion affine MVP candidate, when the number of candidates of the affine MVP candidate list is less than 2, the zero MVP candidate may be added to the affine MVP candidate list.

Figure 16:
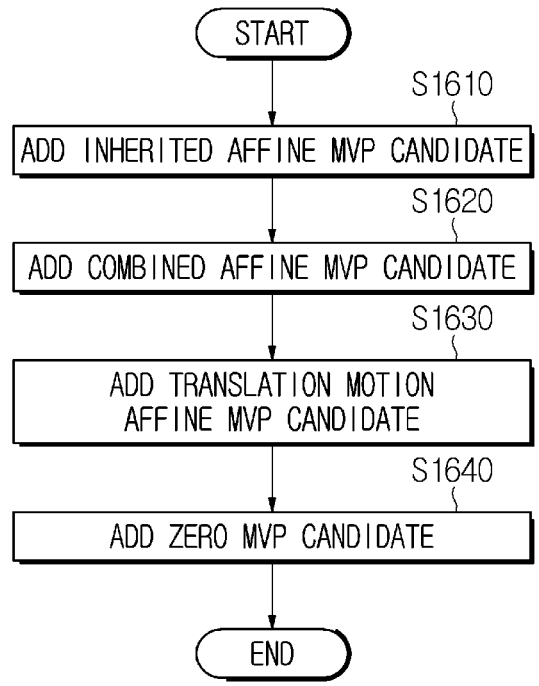
FIG. 16 is a view illustrating a method of generating an affine MVP candidate list.

FIG. 16 is a view illustrating a method of generating an affine MVP candidate list.

Referring to the flowchart of FIG. 16, candidates may be added to the affine MVP candidate list in order of an inherited affine MVP candidate (S1610), a combined affine MVP candidate (S1620), a translation motion affine MVP candidate (S1630) and a zero MVP candidate (S1640). As described above, steps S1620 to S1640 may be performed depending on whether the number of candidates included in the affine MVP candidate list is less than 2 in each step.

Overview of Subblock-Based TMVP Mode

Hereinafter, a subblock-based TMVP mode which is an example of an inter prediction mode will be described in detail. According to the subblock-based TMVP mode, a motion vector field (MVF) for a current block may be derived and a motion vector may be derived in units of subblocks.

Unlike a conventional TMVP mode performed in units of coding units, for a coding unit to which subblock-based TMVP mode applies, a motion vector may be encoded/decoded in units of sub-coding units. In addition, according to the conventional TMVP mode, a temporal motion vector may be derived from a collocated block, but, in the subblock-based TMVP mode, a motion vector field may be derived from a reference block specified by a motion vector derived from a neighboring block of the current block. Hereinafter, the motion vector derived from the neighboring block may be referred to as a motion shift or representative motion vector of the current block.

Figure 17:
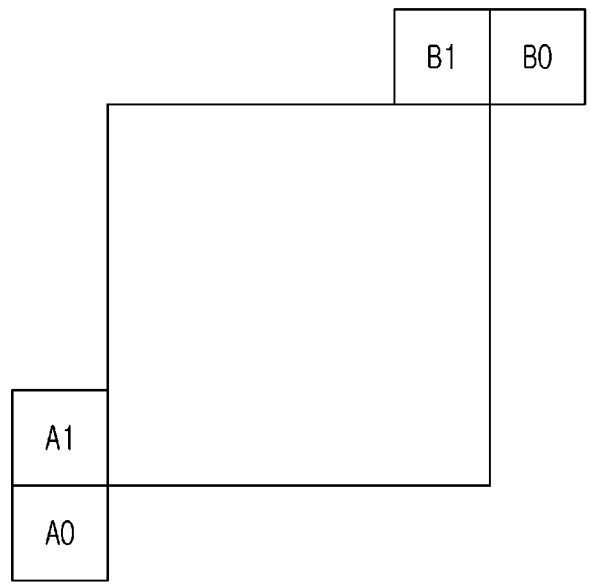
FIG. 17 is a view illustrating neighboring blocks of a subblock based TMVP mode.

FIG. 17 is a view illustrating neighboring blocks of a subblock based TMVP mode.

When a subblock-based TMVP mode applies to a current block, a neighboring block for determining a motion shift may be determined. For example, scan for the neighboring block for determining the motion shift may be performed in order of blocks of A1, B1, B0 and A0 of FIG. 17. As another example, the neighboring block for determining the motion shift may be limited to a specific neighboring block of the current block. For example, the neighboring block for determining the motion shift may always be determined to be a block A1. Meanwhile, when the motion vector cannot be derived from neighboring blocks, the motion shift may be set to (0, 0).

Figures 18, 19:
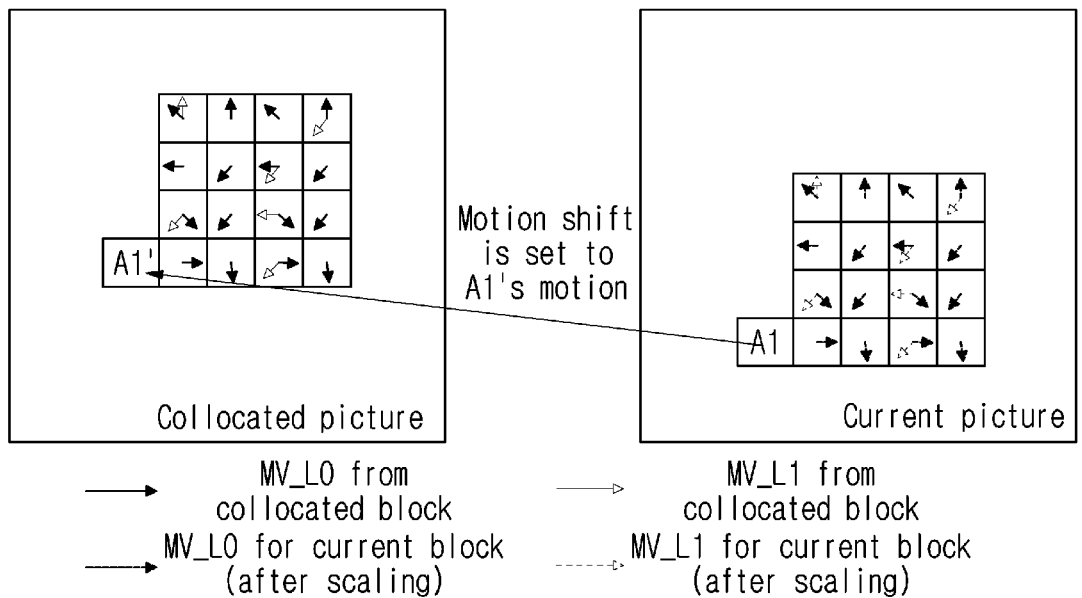
FIG. 18 is a view illustrating a method of deriving a motion vector field according to a subblock-based TMVP mode.
FIG. 19 is a view illustrating a bitstream structure for signaling whether to perform an affine TMVP.

FIG. 18 is a view illustrating a method of deriving a motion vector field according to a subblock-based TMVP mode.

Next, a reference block on the collocated picture specified by a motion shift may be determined. Using motion information of each subblock of the reference block, motion information of each subblock of the current block may be derived. In this case, when the motion information of a specific subblock of the reference block is not available, the motion information of a center subblock of the reference block may be determined to be motion information of the corresponding subblock. When the subblock-based motion vector is derived, scaling of the motion vector may be performed in consideration of POC of the reference picture of the reference block.

As described above, the subblock-based TMVP candidate for the current block may be derived using the motion vector field or motion information of the current block derived based on the subblock.

Hereinafter, a merge candidate list configured in units of subblocks is defined as a subblock unit merge candidate list. The above-described affine merge candidate and subblock-based TMVP candidate may be merged to configure a subblock unit merge candidate list.

Meanwhile, a subblock-based TMVP mode flag specifying whether a subblock-based TMVP mode is applicable to a current block may be defined, which may be signaled at at least one level among higher levels of the current block such as a sequence, a picture, a slice, a tile, a tile group, a brick, etc. For example, the subblock-based TMVP mode flag may be named sps_sbtmvp_enabled_flag. When the subblock-based TMVP mode is applicable to the current block, the subblock-based TMVP candidate may be first added to the subblock unit merge candidate list and then the affine merge candidate may be added to the subblock unit merge candidate list. Meanwhile, a maximum number of candidates which may be included in the subblock unit merge candidate list may be signaled. For example, the maximum number of candidates which may be included in the subblock unit merge candidate list may be 5.

The size of a subblock used to derive the subblock unit merge candidate list may be signaled or preset to M×N. For example, M×N may be 8×8. Accordingly, only when the size of the current block is 8×8 or greater, an affine mode or a subblock-based TMVP mode is applicable to the current block.

Embodiment

Affine TMVP Mode

Hereinafter, a method of deriving motion information of a current block using an affine TMVP mode according to an embodiment of the present disclosure will be described in detail.

Conventionally, a method of individually configuring and merging an affine merge candidate and a subblock-based TMVP candidate to derive a subblock unit merge candidate list is used. However, in this method, there was a problem that two different processes have to be independently performed to configure one candidate list. That is, since signaling of two or more flag signals specifying whether to perform different processes and encoding information for performing each process to configure one candidate list is required, there was a problem that encoding/decoding efficiency is reduced. In consideration of this problem, the present disclosure proposes a method of encoding/decoding motion information of a current block in units of subblocks using an affine TMVP mode obtained by combining the above-described affine merge mode and subblock-based TMVP mode.

A syntax element merge_subblock_flag specifying whether the subblock unit merge candidate list is derived for the current block may be defined. In addition, a syntax element merge_affine_flag specifying whether to apply the affine TMVP mode to the current block or whether the subblock unit merge candidate list according to the affine TMVP mode is derived may be defiled. Even when the affine TMVP mode applies, since the subblock unit merge candidate list is derived, syntax elements merge_subblock_flag and merge_affine_flag may be the same syntax element in an encoding/decoding system, to which the affine TMVP mode applies.

Embodiment 1

Overview of Affine TMVP Mode

FIG. 19 is a view illustrating a bitstream structure for signaling whether to perform an affine TMVP.

FIG. 19(a) shows a conventional bitstream structure. A syntax element sps_sbtmvp_enabled_flag may specify whether a subblock-based TMVP mode is applicable, and sps_affine_enabled_flag may specify whether an affine mode is applicable. In addition, a syntax element slice_temporal_mvp_enabled_flag may specify whether derivation of a temporal candidate is enabled. In the following embodiment, each syntax element may be signaled at at least one level among higher levels of the current block, such as a sequence, a picture, a slice, a tile, a tile group, a brick, etc. For example, when a syntax element temporal_mvp_enabled_flag is signaled through a picture header, a syntax element specifying whether derivation of a temporal candidate is enabled may be named ph_temporal_mvp_enabled_flag. In addition, in each syntax element, a first name part of the syntax element may be changed to at least one of sps, pps, ph, slice, sh, tile or tile_group based on a level or unit at which the corresponding syntax element is signaled. That is, in the following embodiments, the detailed name of the syntax element does not affect the signaling level or scope of the corresponding syntax element.

Conventionally, when a subblock unit merge candidate list is configured, a process of checking each of values of sps_sbtmvp_enabled_flag, slice_temporal_mvp_enabled_flag and sps_affine_enabled_flag by separately signaling sps_sbtmvp_enabled_flag and sps_affine_enabled_flag was performed. That is, conventionally, when a subblock unit merge candidate list is configured, respective signaling and respective process for an affine merge mode and a subblock-based TMVP mode were performed. Therefore, there is a problem that encoding/decoding efficiency is reduced.

FIG. 19(b) shows a bitstream structure which may be used in an image system, to an affine TMVP mode applies. According to FIG. 19(b), in an image system to which an affine TMVP applies, a process of checking a value of slice_temporal_mvp_enabled_flag and signaling of sps_sbtmvp_enabled_flag may be skipped. According to the present embodiment, since a process of deriving subblock unit merge candidate list is unified as signaling of sps_affine_enabled_flag and an affine process, encoding/decoding efficiency may be improved.

FIG. 20 is a view illustrating a method of deriving a merge candidate list in units of subblocks.

Figure 20A:
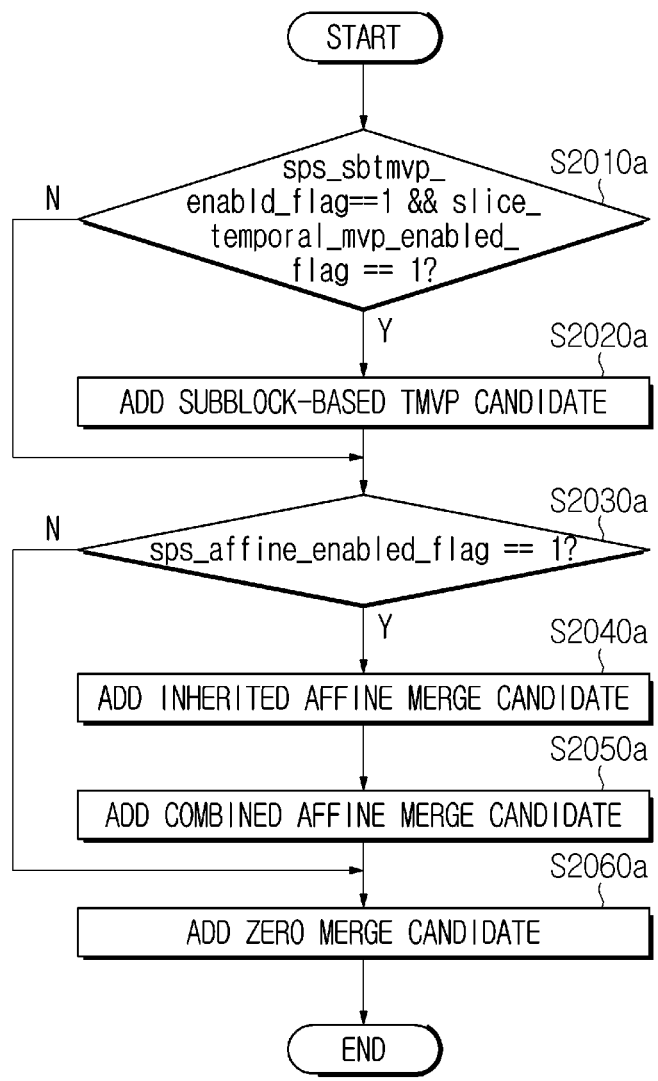
FIG. 20 is a view illustrating a method of deriving a merge candidate list in units of subblocks.
Figure 20B:
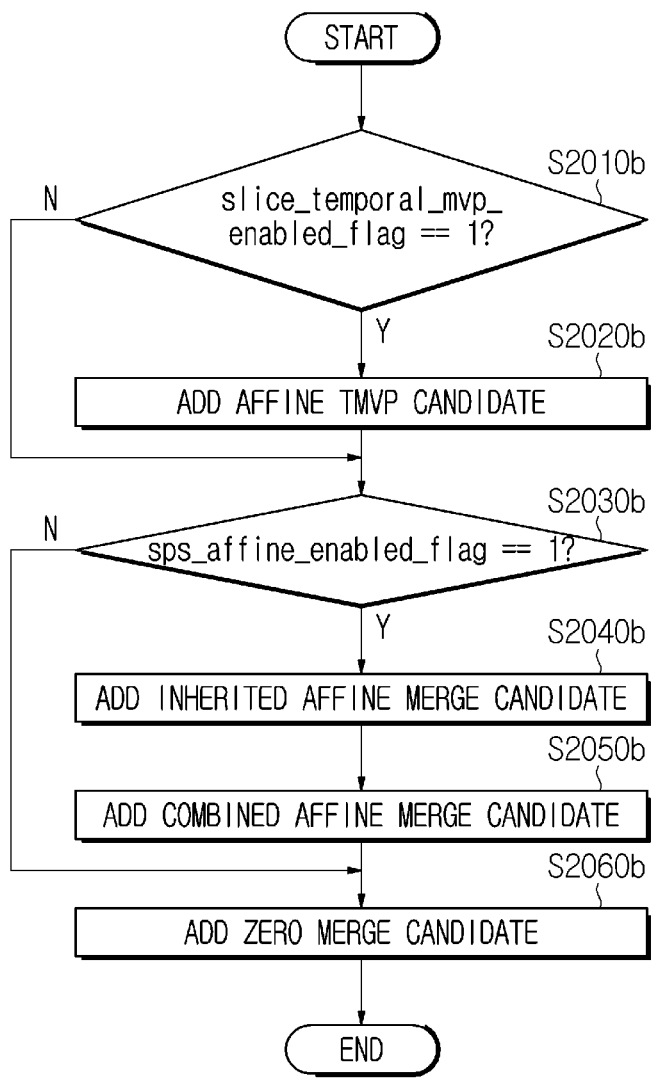

FIG. 20(a) shows a conventional method of configuring a subblock unit merge candidate list, to which a subblock-based TMVP mode and an affine merge mode apply, and FIG. 20(b) shows a method of configuring a subblock unit merge candidate list, to which an affine TMVP mode applies instead of a subblock-based TMVP. A detailed description of each step shown in FIGS. 20(a) and 20(b) is the same as that described in the affine merge mode and the subblock-based TMVP mode and thus will be omitted. In the following description, a subblock unit merge candidate list and a merge candidate list may be used as the same meaning.

According to FIG. 20(a), whether values of syntax elements sps_sbtmvp_enabled_flag and slice_temporal_mvp_enabled_flag are 1 may be determined (S2010a). When both the values of sps_sbtmvp_enabled_flag and slice_temporal_mvp_enabled_flag are 1, a subblock-based TMVP candidate may be derived and added to a merge candidate list (S2020a). In contrast, when at least one of the values of sps_sbtmvp_enabled_flag and slice_temporal_mvp_enabled_flag is not 1, step S2020a of adding a subblock-based TMVP candidate to the merge candidate list may be skipped. Next, whether a value of a syntax element sps_affine_enabled_flag is 1 may be determined (S2030a). When the value of sps_affine_enabled_flag is 1, an inherited affine merge candidate (S2040a) and a combined affine merge candidate (S2050a) may be derived and added to a merge candidate list. Next, a zero merge candidate (S2060a) may be added to the merge candidate list. Meanwhile, when the value of sps_affine_enabled_flag is not 1, addition of the inherited affine merge candidate and the combined affine merge candidate may be skipped.

FIG. 20(b) shows a method of deriving a subblock unit merge candidate list in an image system to which an affine TMVP mode applies. According to FIG. 20(b), step of checking a value of a syntax element sps_sbtmvp_enabled_flag may be skipped. When the value of the syntax element slice_temporal_mvp_enabled_flag is 1 (S2010b), an affine TMVP candidate may be derived and added to the merge candidate list (S2020b). The remaining steps of FIG. 20(b) are the same as that described with reference to FIG. 20(a) and a description thereof will be omitted. Meanwhile, in FIG. 20(b), step S2030b may be omitted. When an affine TMVP mode applies to the current block, since the image system assumes application of the affine mode, step S2030b of determining the value of sps_affine_enabled_flag may be skipped. According to the method shown in FIG. 20(b), some syntax element signaling and value determination processes may be skipped and thus encoding/decoding efficiency may be increased.

Meanwhile, a maximum number of candidates which may be included in the subblock unit merge candidate list may be defined, which may be named as a syntax element Max-NumSubblockMergeCand. For example, MaxNumSubblockMergeCand may have one of values of 0 to 5. In this case, information specifying the maximum number of candidates which may be included in the subblock unit merge candidate list may be signaled, which may be signaled at at least one of higher levels of the current block, such as a sequence, a picture, a slice, a tile, a tile group, a brick, etc. For example, when the affine merge mode applies to the current block (sps_affine_enabled_flag==1), a syntax element five_minus_max_num_subblock_merge_c and may be signaled. Here, five_minus_max_num_subblock_merge_cand may specify a value obtained by subtracting 5 from the maximum number of candidates which may be included in the subblock unit merge candidate list. Meanwhile, when five_minus_max_num_subblock_merge_cand is not signaled or the value thereof is not predefined, the value may be determined to be 5-sps_sbtmvp_enabled_flag.

That is, the number of candidates of the subblock unit merge candidate list may be from 0 to 5, and the maximum number of candidates may be determined according to at least one of whether the subblock-based TMVP mode applies to the current block or whether five_minus_max_num_subblock_merge_cand is signaled. For example, when the affine merge mode applies to the current block and the value of five_minus_max_num_subblock_merge_cand is signaled as 0, the maximum number of candidates of the subblock unit merge candidate list may be 5 (MaxNumSubblockMergeCand=5). In contrast, when the affine mode does not apply to the current block (sps_affine_enabled_flag==0), the maximum number of candidates of the subblock unit merge candidate list may be determined to be 0 or 1 depending on whether the subblock-based TMVP applies to the current block.

Meanwhile, when the affine TMVP mode applies, since the subblock-based TMVP mode does not apply, the maximum number of candidates of the subblock unit merge candidate list may be determined regardless of whether the subblock-based TMVP mode applies to the current block. For example, when five_minus_max_num_subblock_merge_cand is not signaled or the value is not predefined, the value of five_minus_max_num_subblock_merge_cand may be determined to be 5. That is, the maximum number of candidates of the subblock unit merge candidate list may be 0 to 5. In addition, the maximum number of candidates of the subblock unit merge candidate list may be determined regardless of whether the subblock-based TMVP mode applies to the current block.

Embodiment 2

Derivation of CPMV Using One Neighboring Block

Figure 21:
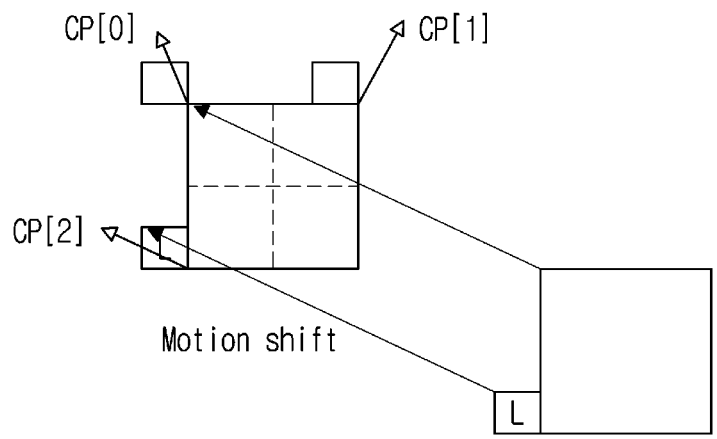
FIG. 21 is a view illustrating an affine TMVP mode according to an embodiment of the present disclosure.
Figure 22:
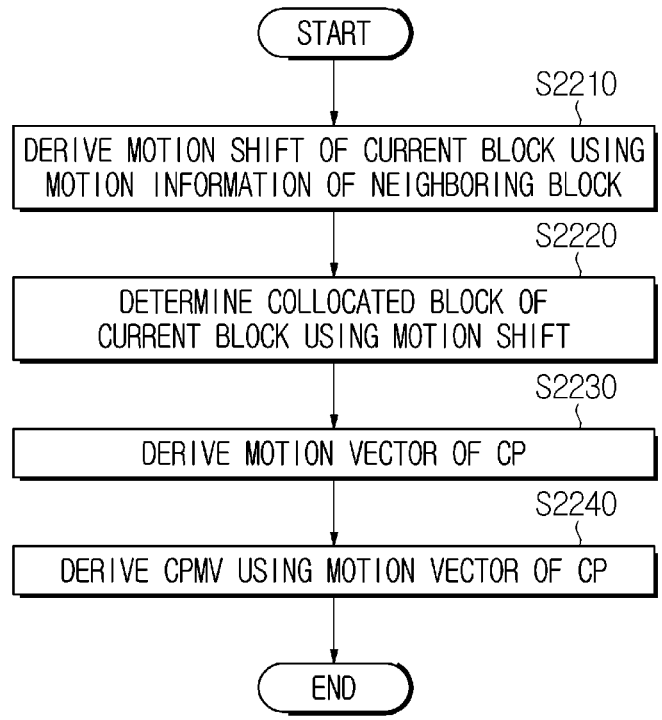
FIG. 22 is a view illustrating an image encoding/decoding method according to an embodiment of the present disclosure.

FIG. 21 is a view illustrating an affine TMVP mode according to an embodiment of the present disclosure, and FIG. 22 is a view illustrating an image encoding/decoding method according to an embodiment of the present disclosure.

FIG. 21 is a view schematically illustrating operation of the affine TMVP mode. An image encoding/decoding apparatus may derive motion information of a neighboring block L of a current block. In this case, a motion vector derived from the neighboring block may be defined as a motion shift or a representative motion vector. For example, the neighboring block may be a left neighboring block A1 of the current block as shown in FIG. 17. The image encoding/decoding apparatus may derive a collocated block (hereinafter referred to as a col block) of the current block using the motion shift. In the following description, the collocated block may mean a block or reference block on a collocated picture specified by the motion shift based on the position of the current block. Next, the image encoding/decoding apparatus may derive at least one of the motion vectors of CP0, CP1 and CP2 of the collocated block and derive a CPMV or affine TMVP candidate of the current block.

Referring to FIG. 22, an image encoding/decoding method using an affine TMVP according to an embodiment of the present disclosure may include step S2210 of deriving a motion shift of a current block using motion information of a neighboring block adjacent to the current block, step S2220 of determining a collocated block of the current block using the motion shift, step S2230 of deriving a motion vector of at least one CP of the collocated block and/or step S2240 of deriving a CPMV of the current block using the motion vector of the CP.

Embodiment 3

Derivation of CPMV Using a Plurality of Neighboring Blocks

Figure 23:
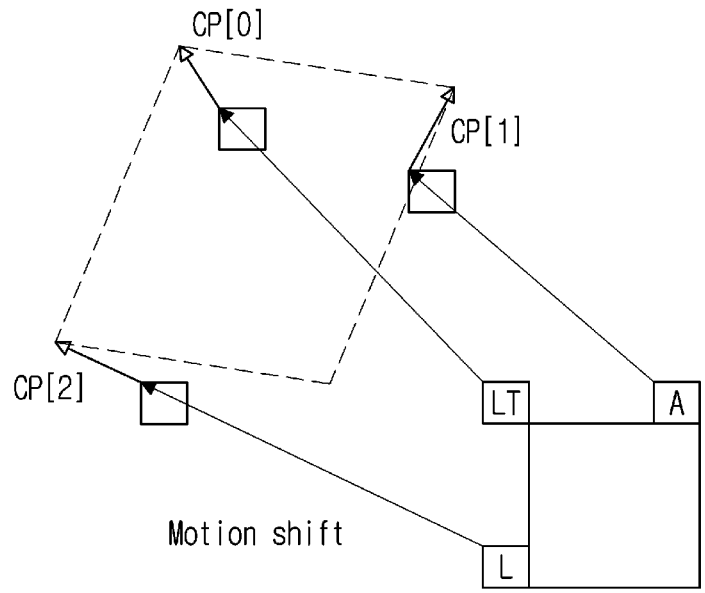
FIG. 23 is a view illustrating an affine TMVP mode according to another embodiment of the present disclosure.

FIG. 23 is a view illustrating an affine TMVP mode according to another embodiment of the present disclosure.

FIG. 23 is a view schematically illustrating operation of an affine TMVP mode according to another embodiment of the present disclosure. Using motion information of a plurality of neighboring blocks of the current block, a motion shift for each neighboring block may be derived. For example, the neighboring block may be a top left neighboring block (LT), a top neighboring block (A) and a left neighboring block of the current block, which are respectively B2, B1 and A1 of FIG. 15. The image encoding/decoding apparatus may derive a collocated block for each neighboring block using the motion shift for each neighboring block. Next, the image encoding/decoding apparatus may derive at least one of motion vectors of each collocated block to derive a CPMV or affine TMVP candidate of the current block. In the following description, a collocated block derived through the motion shift of the top left neighboring block may be defined as CP0, a collocated block derived through the motion shift of the right neighboring block may be defined as CP1, a collocated block derived through the motion shift of the left neighboring block may be defined as CP2, and CPMVs derived using the motion vectors of CP0, CP1 and CP2 may be respectively defined as CPMV0, CPMV1 and CPMV2.

For example, the image encoding/decoding method using the affine TMVP according to another embodiment of the present disclosure may include a step of deriving a first motion shift, second motion shift and third motion shift of the current block using motion information of a first neighboring block, a second neighboring block and a third neighboring block adjacent to the current block, a step of deriving a first collocated block, second collocated block and third collocated block of the current block using the first motion shift, the second motion shift and the third motion shift, a step of deriving a motion vector of a first CP using the first collocated block, deriving a motion vector of a second CP using the second collocated block and deriving a motion vector of a third CP using the third collocated block, and a step of deriving a first CPMV using the motion vector of the first CP, deriving a second CPMV using the motion vector of the second CP and deriving a third CPMV using the motion vector of the third CP.

Meanwhile, each CP may be derived only when each neighboring block is available. In the following description, availability of the neighboring block and availability of the CP determined using the motion shift of the neighboring block may be used as the same meaning.

FIGS. 24 to 27 are views illustrating an affine TMVP candidate derivation process according to availability of a CP.

Figure 24:
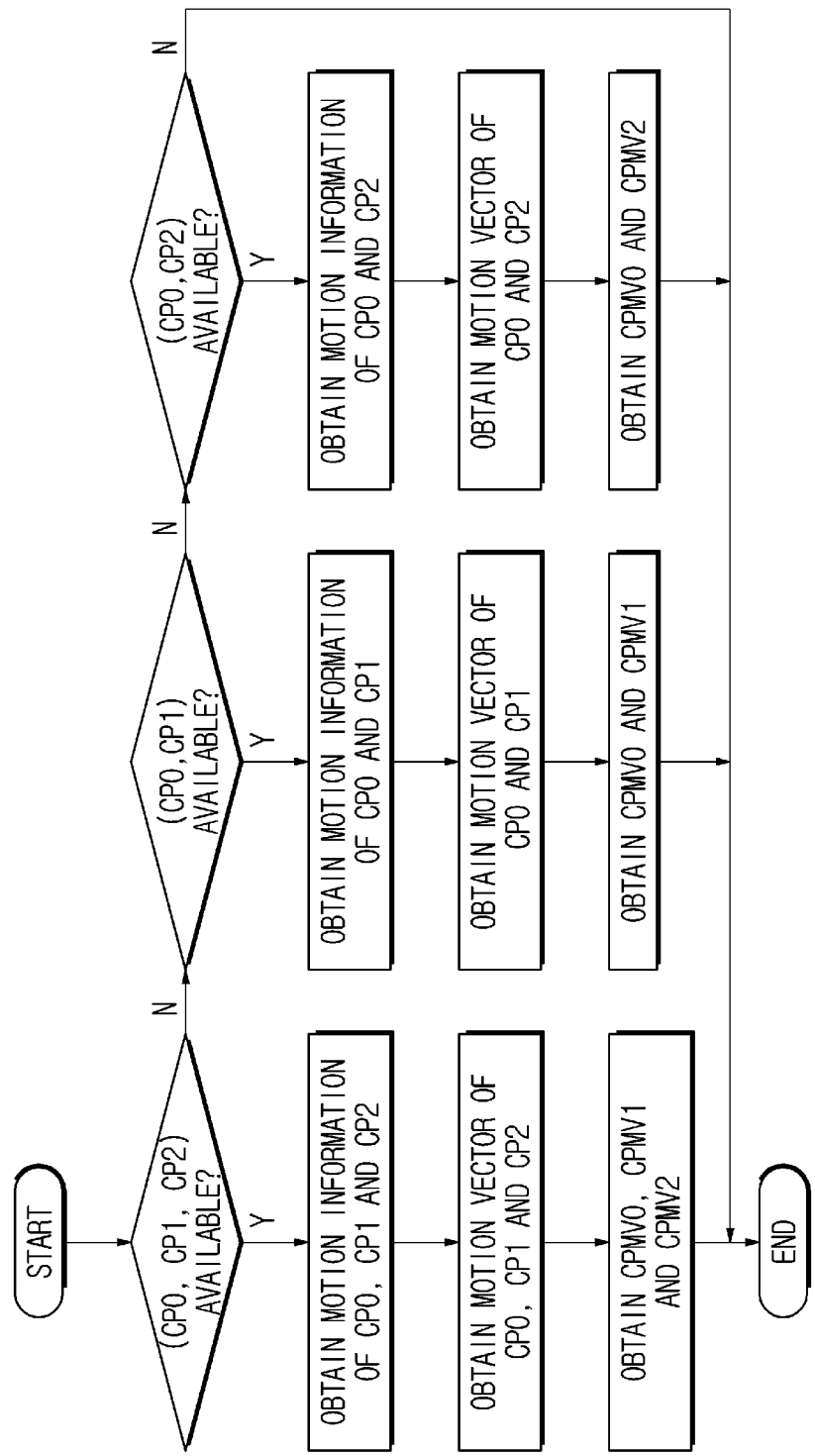
FIG. 24 is a view illustrating a method of deriving an affine TMVP according to an embodiment of the present disclosure.

FIG. 24 shows a method of deriving one affine TMVP candidate. According to FIG. 24, availability of CP combinations is determined in order of (CP0, CP1, CP2), (CP0, CP1) and (CP0, CP2), and, when an available CP combination is confirmed, an affine TMVP candidate may be generated through a CPMV combination derived using the corresponding CP combination. Affine TMVP candidate generation may end when at least one CPMV combination is derived.

Figure 25:
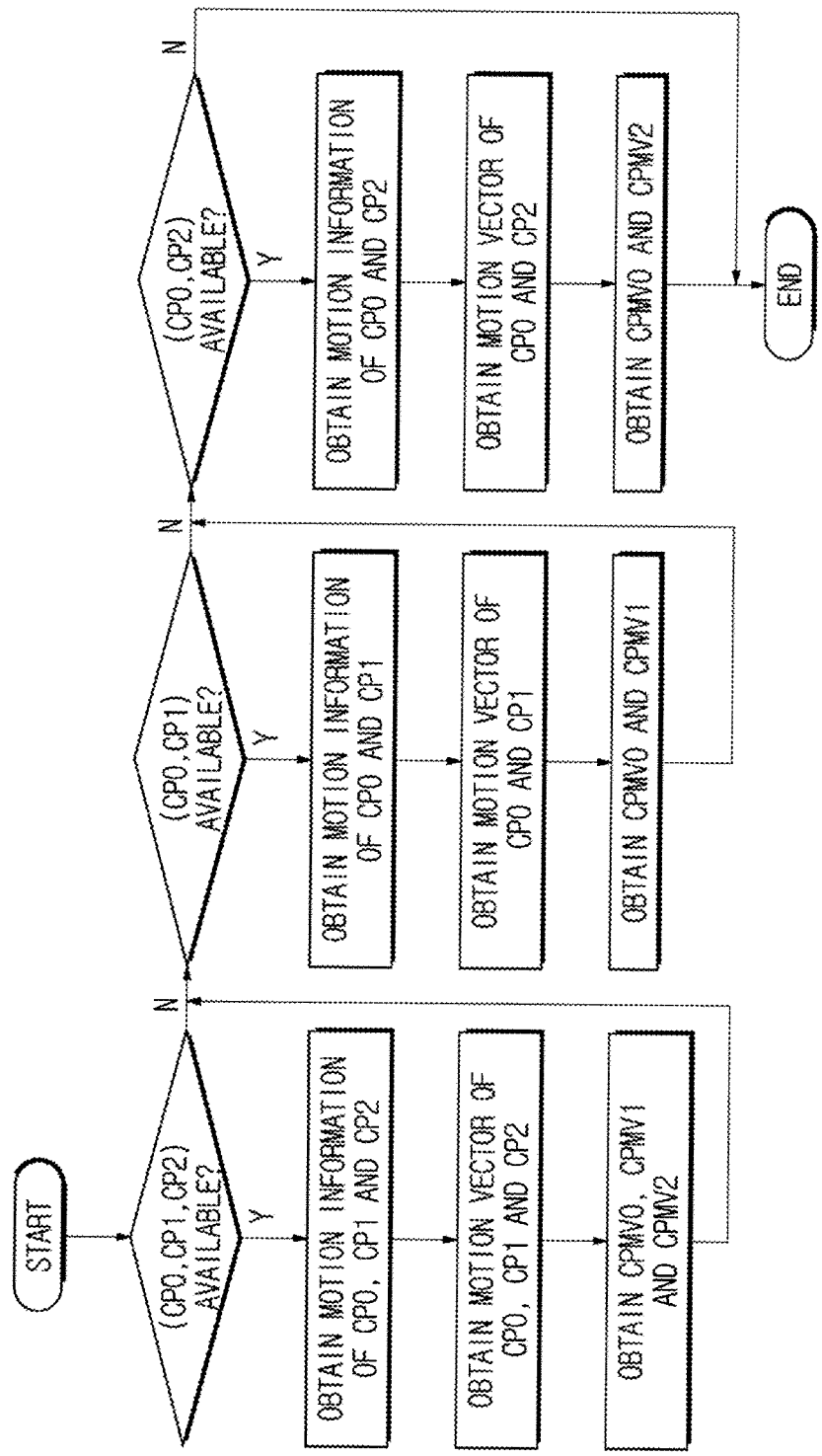
FIG. 25 is a view illustrating a method of deriving an affine TMVP according to another embodiment of the present disclosure.

FIG. 25 shows a method of deriving a plurality of affine TMVP candidates. According to FIG. 25, availability of CP combinations is determined in order of (CP0, CP1, CP2), (CP0, CP1) and (CP0, CP2), and a plurality of affine TMVP candidates may be generated through CPMV combinations derived using available CP combinations. Affine TMVP candidate generation may end when determination as to availability of all CPMV combinations is completed.

Figure 26:
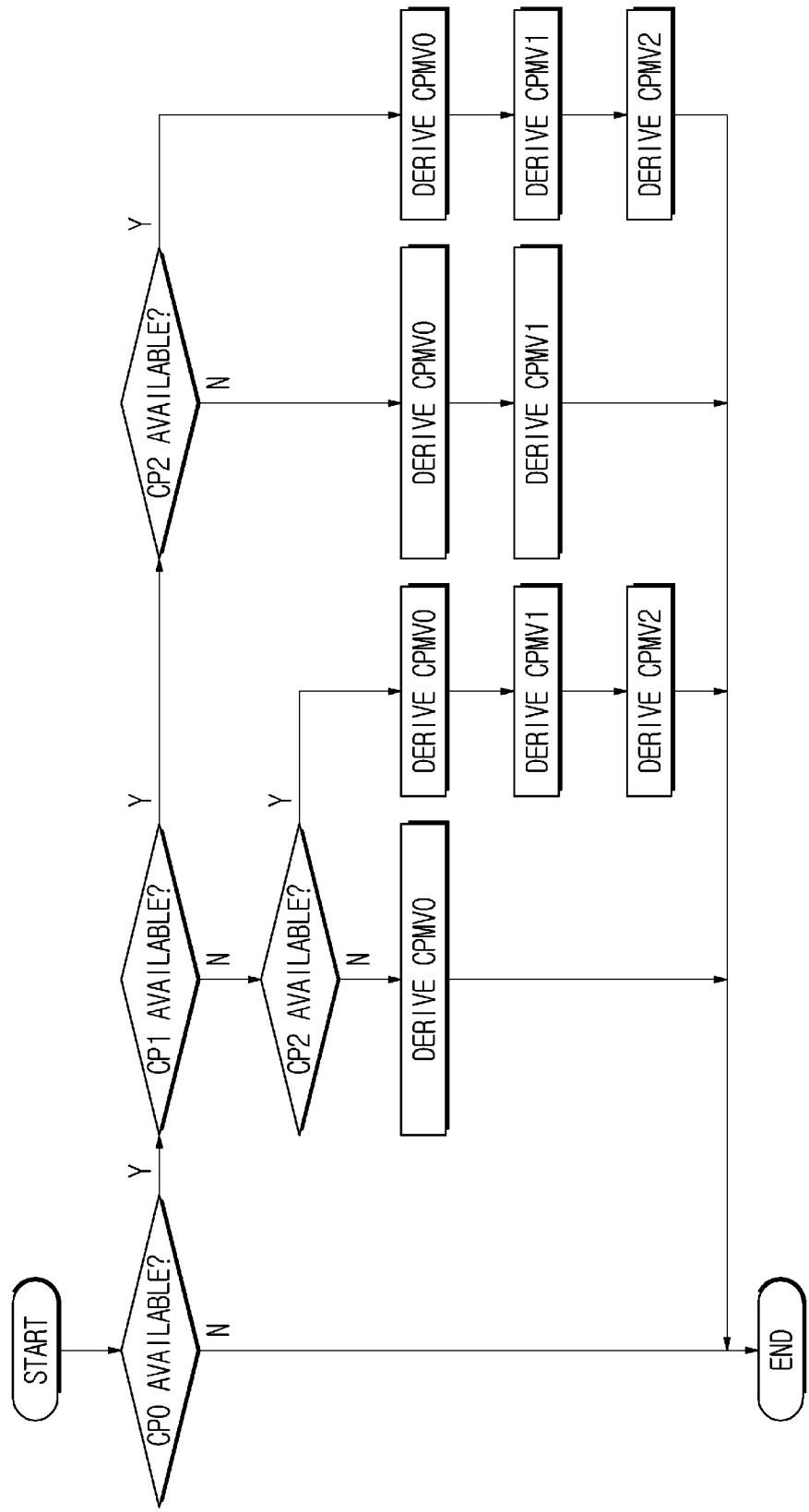
FIG. 26 is a view illustrating a method of deriving an affine TMVP according to another embodiment of the present disclosure.
Figure 27:
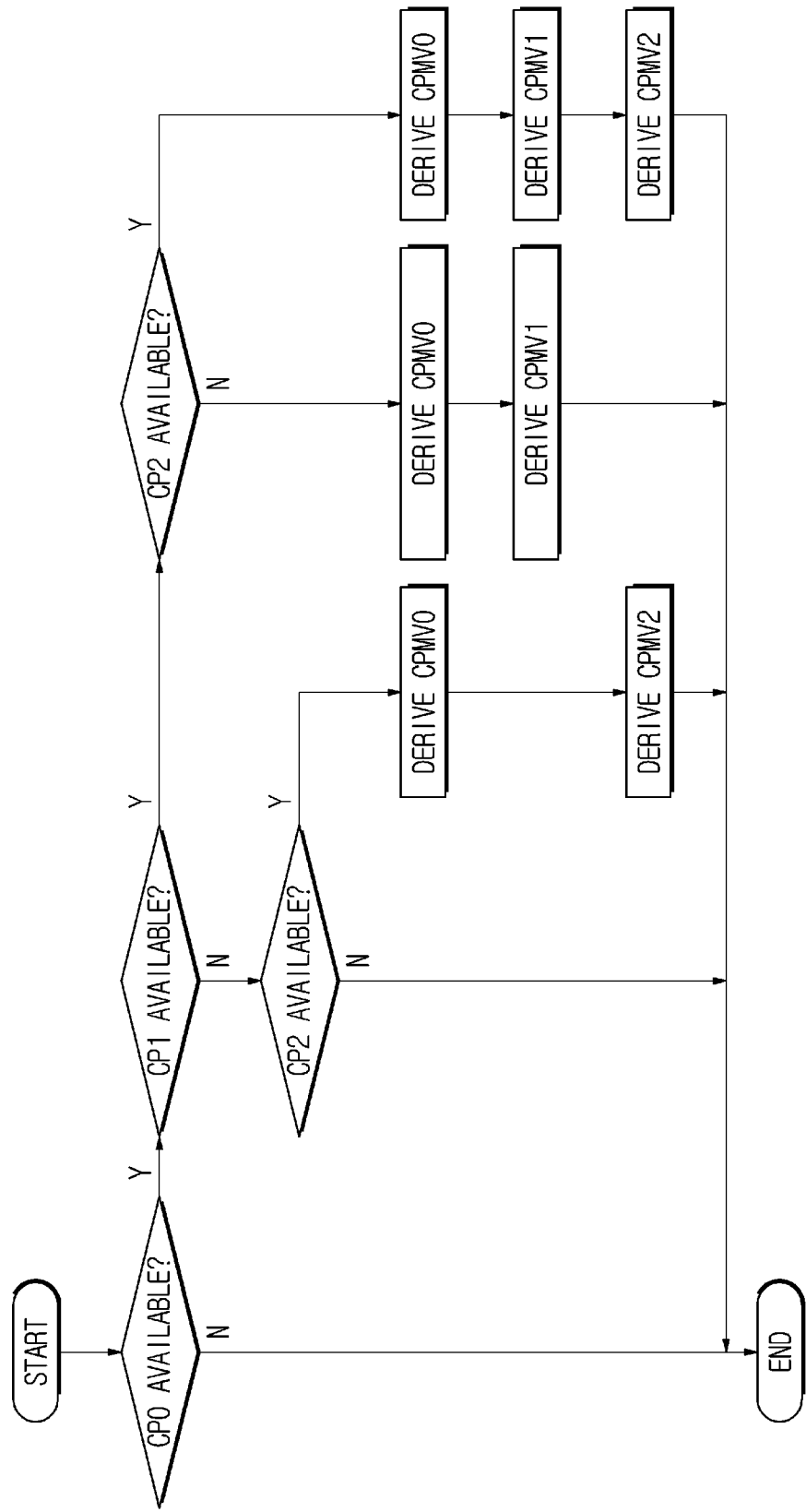
FIG. 27 is a view illustrating a method of deriving an affine TMVP according to another embodiment of the present disclosure.

FIGS. 26 and 27 show a method of deriving an affine TMVP candidate based on individual availability determination for each CP.

According to FIGS. 26 and 27, when CP0 is not available, affine TMVP candidate generation may end without generating the affine TMVP candidate. According to FIGS. 26 and 27, determination of availability may be made in order of CP0, CP1 and CP2.

For example, as shown in FIG. 26, when CP0 is available, CP1 is not available and CP2 is not available, CPMV0 may be derived. As another example, as shown in FIG. 27, when CP0 is available, CP1 is not available and CP2 is not available, affine TMVP candidate generation may end without generating the affine TMVP candidate.

In addition, when CP0 is available, CP1 is not available and CP2 is available, CPMV0 and CPMV2 may be derived. When CP0 is available, CP1 is available and CP2 is not available, CPMV0 and CPMV1 may be derived. When CP0, CP1 and CP2 are available, all CPMV0, CPMV1 and CPMV2 may be derived.

Embodiment 4

Coordinate Determination Method #1 of CP

Hereinafter, a method of determining coordinates of a CP when an affine TMVP candidate of a current block is derived using one neighboring block will be described. That is, a method of determining coordinates of a CP when one collocated block is used for an affine TMVP candidate will be described.

FIGS. 28 to 34 are views illustrating control point (CP) coordinate determination methods according to some embodiments of the present disclosure. In the following description, W and H may mean the width and height of the current block, respectively. In addition, the coordinates of each CP may be coordinates specifying a relative position determined when the top left coordinates of a collocated block determined by a motion shift are defined as (0, 0).

Figure 28:
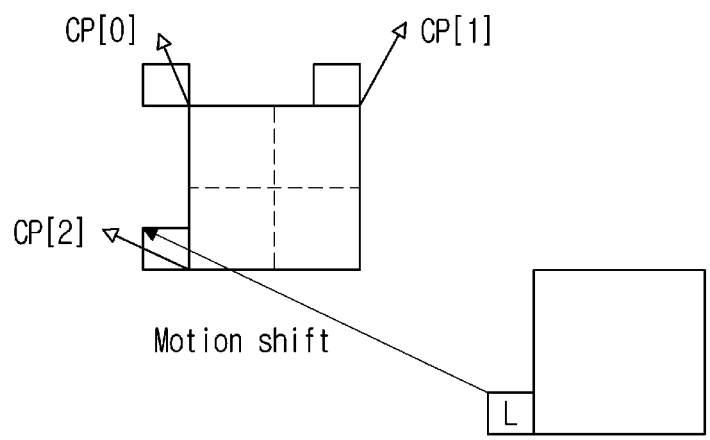
FIGS. 28 to 34 are views illustrating control point (CP) coordinate determination methods according to some embodiments of the present disclosure.

For example, referring to FIG. 28, the coordinates of CP0, CP1 and CP2 may be determined to be (−1, −1), (W−1, −1) and (−1, H−1), respectively. In this case, the CPMV of each CP may be determined to be a motion vector of a block including the coordinates of the CP.

Figure 29:
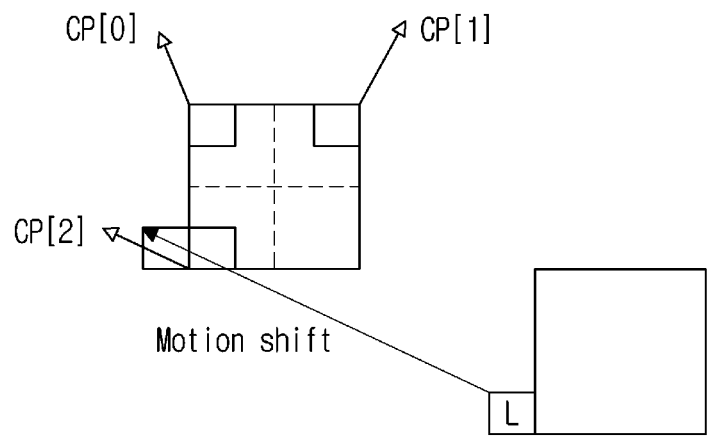

As another example, referring to FIG. 29, the coordinates of CP0, CP1 and CP2 may be determined to be (0, 0), (W−1, 0) and (0, H−1), respectively.

Figure 30:
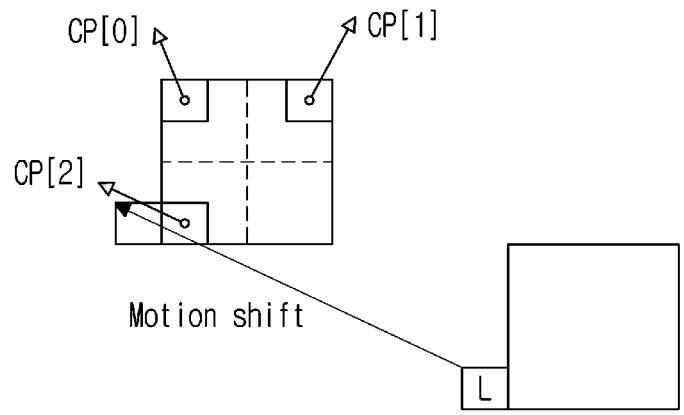

As another example, referring to FIG. 30, the coordinates of CP0, CP1 and CP2 may be determined to be (2, 2), (W−2, 2) and (2, H−2), respectively.

Figure 31:
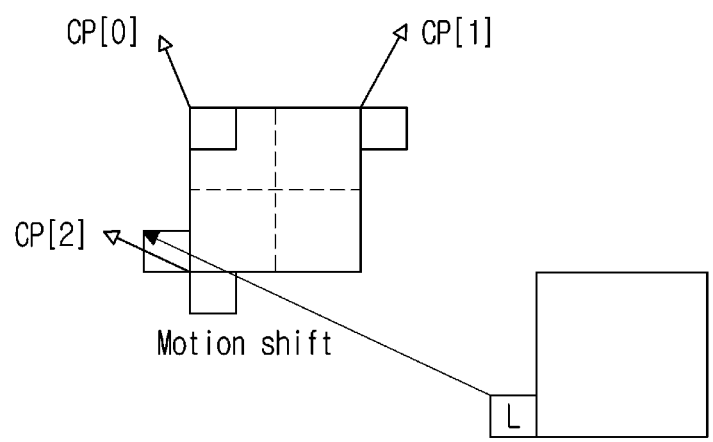

As another example, when the CP coordinates of FIGS. 29 and 30 are used without change, since it is necessary to change the width and height values of the current block in the MVF derivation equations according to Equations 1 and 2, the coordinates of the CP may be modified as shown in FIG. 31. For example, (0, 0), (W, 0), (0, H) may be used as the coordinates of CP0, CP1 and CP2. Meanwhile, when the position of (0, H) is out of the boundary of a current CTU, the coordinates (0, H) may be changed to (0, H−1). As another example, when the position of (0, H) is out of the boundary of a current CTU, the motion vector of CP2 may not be used to derive the CPMV.

Figure 32:
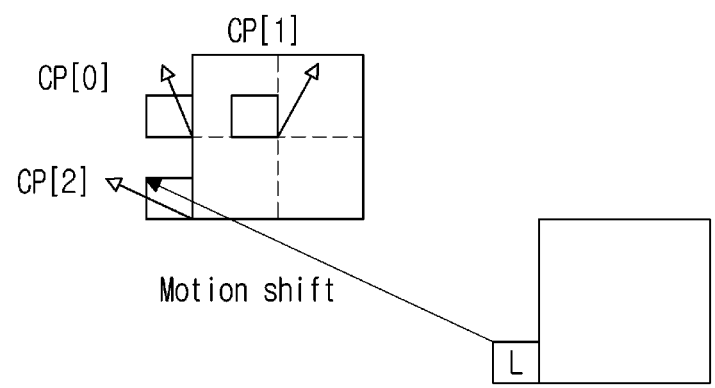

As another example, referring to FIG. 32, the coordinates of CP0, CP1 and CP2 may be determined to be (−1, (H/2)−1), ((W/2)−1, (H/2)−1) and (−1, H−1) in consideration of the center position of a collocated block.

Figure 33:
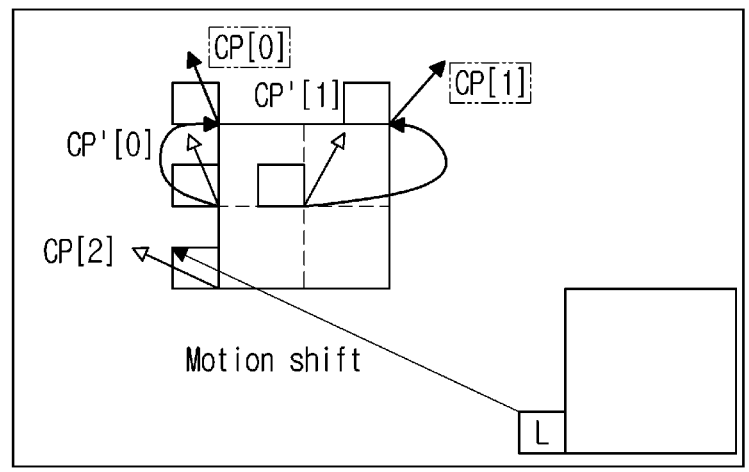
Figure 33:
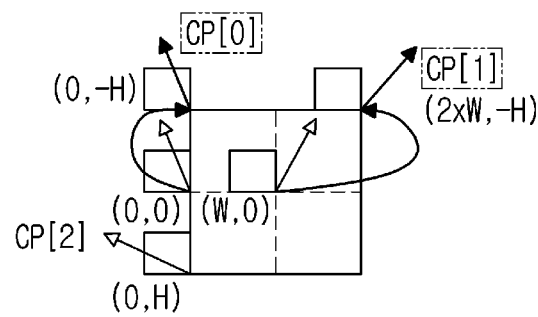

As another example, when the CP coordinates of FIG. 32 are used without change, errors may occur when MVF derivation equations according to Equations 1 and 2 are used. In order to solve this problem, CP0 and CP1 of FIG. 32 may be modified as shown in FIG. 33. The coordinates (−1, (H/2)−1), ((W/2)−1, (H/2)−1) and (−1, H−1) of CP0', CP1' and CP2 of FIG. 33 may be respectively modified to (0, 0), (W, 0), (0, H), and, based on this, (0, −H) and (2×W, −H) which are coordinates of CP0 and CP1 may be derived. Finally, the coordinates of CP0, CP1 and CP2 may be determined to be (0, −H), (2×W, −H) and (0, H). Correction of these coordinates may be made with respect to the CP coordinates of FIGS. 29 and 30.

Figure 34:
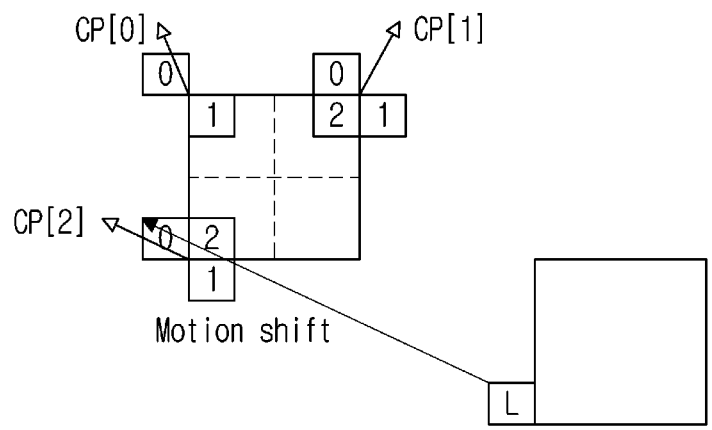

As another example, referring to FIG. 34, the coordinates of each CP may be determined to be one of a plurality of coordinate candidates. For example, the coordinates of CP0 may be determined to be one of candidate coordinates (−1, −1) and (0, 0), the coordinates of CP1 may be determined to be one of candidate coordinates (W−1, −1), (W, 0) and (W−1, 0), and the coordinates of CP2 may be determined to be one of candidate coordinates (−1, H−1), (0, H) and (0, H−1). The number shown in FIG. 34 may mean the scan order of each candidate. The positions and order of the above-described candidates are merely an example and the scope of the present disclosure is not limited to the above-described coordinates and order. Meanwhile, when the position of (0, H) is out of the boundary of a current CTU, the corresponding coordinates may not be the coordinate candidate of CP2.

The coordinates of the CP may be determined through at least one or a combination of one or more of the above-described embodiments. In this case, a reference picture index for determining a collocated picture may always be set to 0. Although the method of deriving the coordinates of each CP using the left neighboring block of the current block has been described so far, the neighboring block may be determined to be one of the neighboring blocks shown in FIG. 15 as well as the left neighboring block. Meanwhile, when the affine TMVP candidate is added after the inherited affine merge candidate and the combined affine merge candidate, the motion shift of a first neighboring block used (or available) to derive the affine candidate may be determined to be the motion shift of the current block for deriving the affine TMVP candidate.

Embodiment 5

Determination of Coordinates of CP when CPMV is Derived Using a Plurality of Neighboring Blocks Hereinafter, a method of determining coordinates of a CP when an affine TMVP candidate of a current block is derived using a plurality of neighboring blocks will be described. That is, a method of determining coordinates of a CP when a plurality of collocated blocks is used to derive an affine TMVP candidate will be described.

Figure 35:
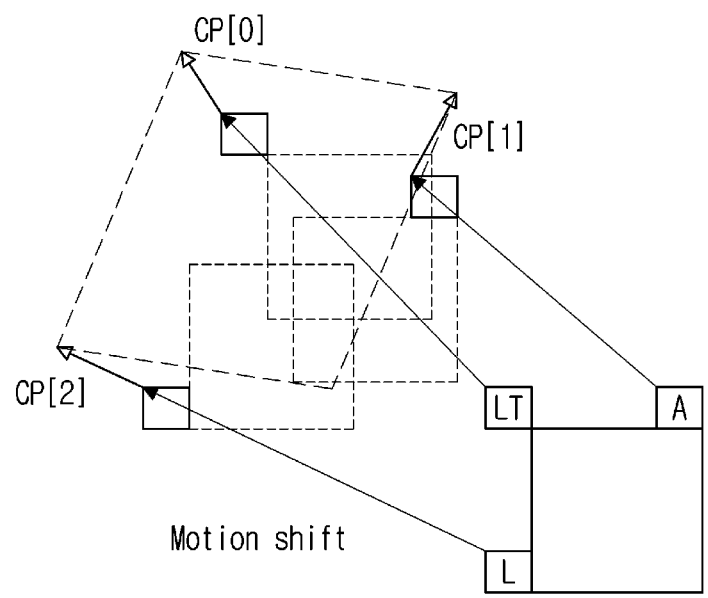
FIGS. 35 and 36 are views illustrating CP coordinate determination methods according to some other embodiments of the present disclosure.
Figure 36:
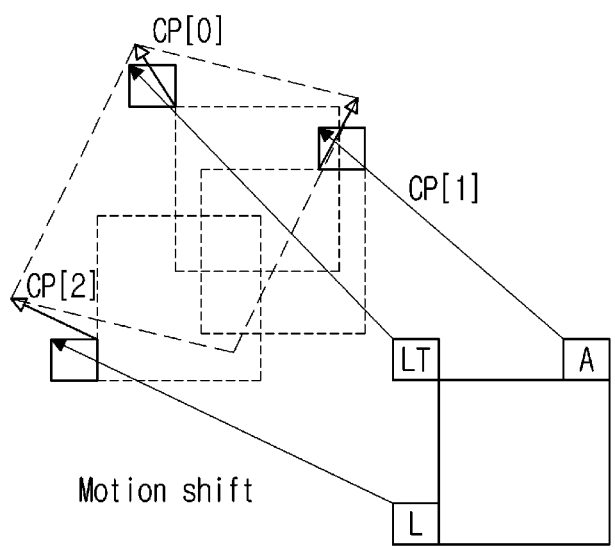

FIGS. 35 and 36 are views illustrating CP coordinate determination methods according to some other embodiments of the present disclosure.

As described above, the coordinates of a CP for a current block may be determined using each motion shift derived from a plurality of neighboring blocks. When the position of the current block is (x,y) and the values of representative motion vectors derived from a top left neighboring block, a top neighboring block and a left neighboring block are respectively (MVt0_x, MVt0_y), (MVt1_x, MVt1_y) and (MVt2_x, MVt2_y), the coordinates of the CP may be determined as follows.

For example, according to FIG. 35, the coordinates of the CP may be determined according to Equation 3 below.

$$CP0=(x,y)+(MVt0\_x,MVt0\_y)+(-1,-1)$$

$$CP1=(x,y)+(MVt1\_x,MVt1\_y)+(w-1,-1)$$

$$CP2=(x,y)+(MVt2\_x,MVt2\_y)+(-1,h-1) \quad \text{[Equation 3]}$$

As another example, according to FIG. 36, the coordinates of the CP may be determined according to Equation 4 below.

$$CP0=(x,y)+(MVt0\_x,MVt0\_y)$$

$$CP1=(x,y)+(MVt1\_x,MVt1\_y)+(w-1,0)$$

$$CP2=(x,y)+(MVt2\_x,MVt2\_y)+(0,h-1) \quad \text{[Equation 4]}$$

Embodiment 6

CPMV Derivation

Hereinafter, a method of deriving a CPMV for a current block based on determination of availability of a CP will be described in detail.

When a block including the coordinates of the CP is encoded/decoded in an inter prediction mode, it may be determined that the corresponding CP may be available. In contrast, when a block including the coordinates of the CP is encoded/decoded in an intra prediction or intra block copy (IBC) mode, it may be determined that the corresponding CP is not available. Meanwhile, when a block specified by the derived motion vector is out of the boundary of the current picture or specifies a long term reference picture, it may be determined that the corresponding CP is not available.

Availability check for each CP may be performed for each reference picture list. Based on a result of determining availability of CPs, the CPMV for the current block may be derived.

Figure 37:
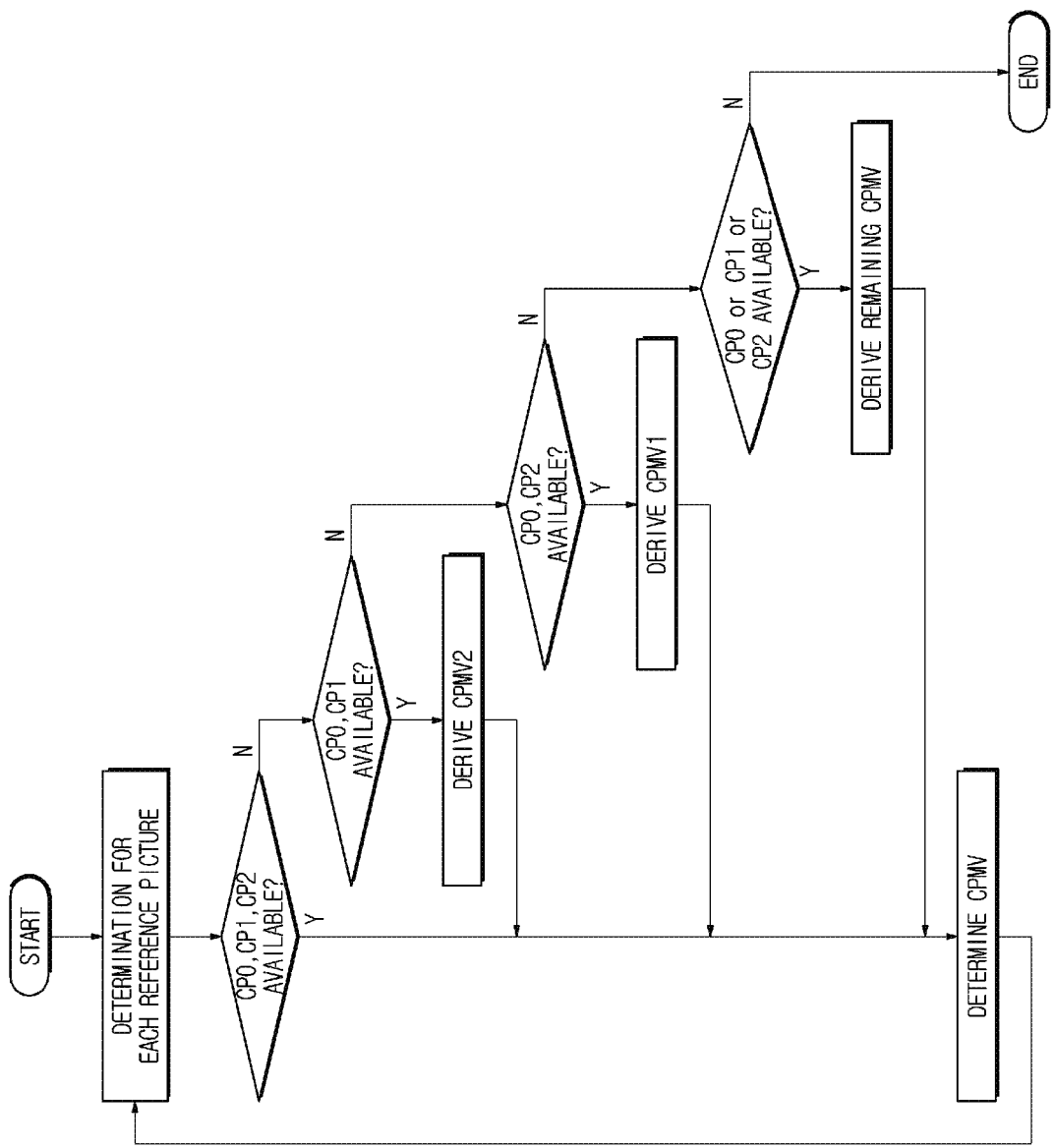
FIGS. 37 and 38 are views illustrating CPMV derivation methods according to some embodiments of the present disclosure.
Figure 38:
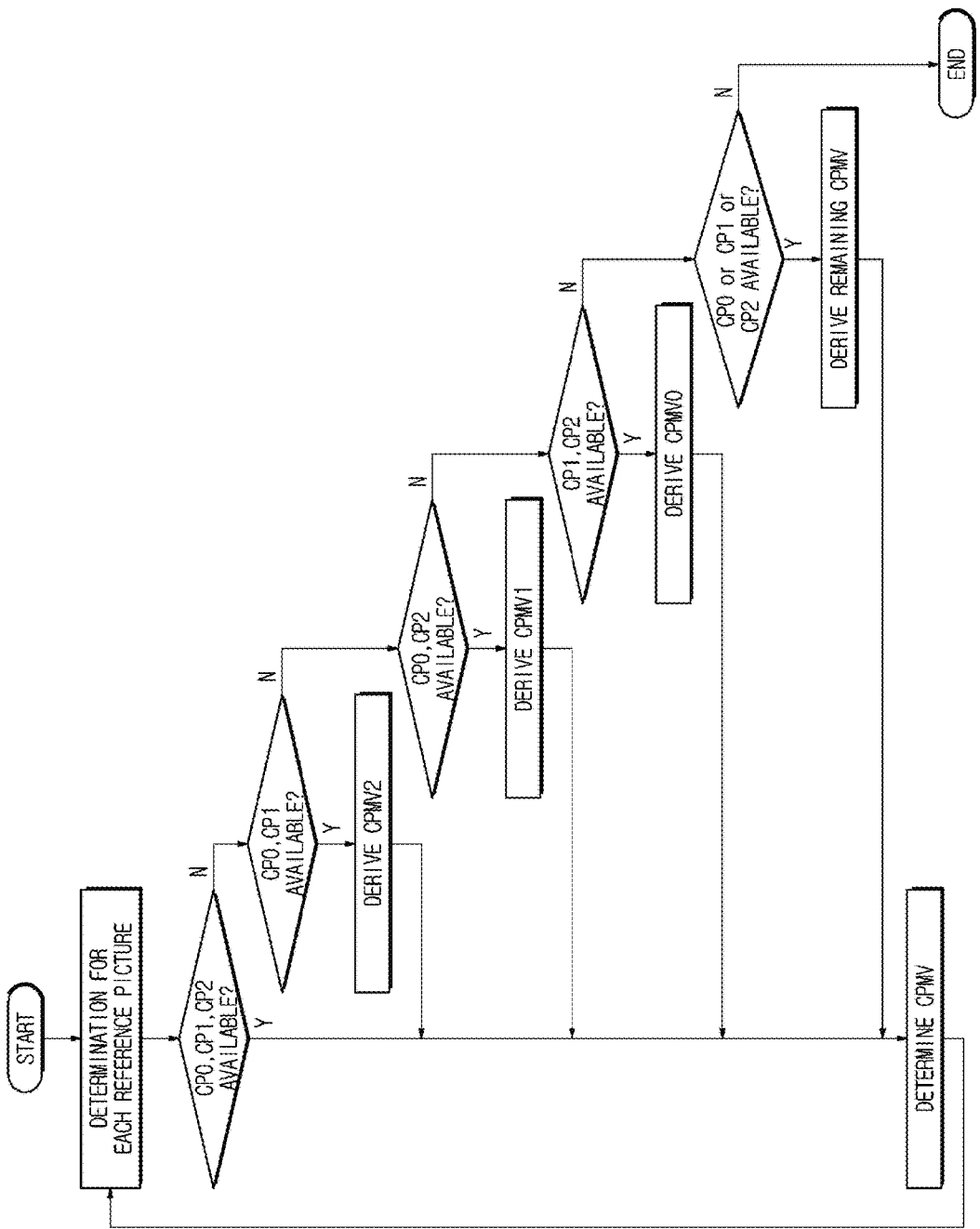
Figure 39:
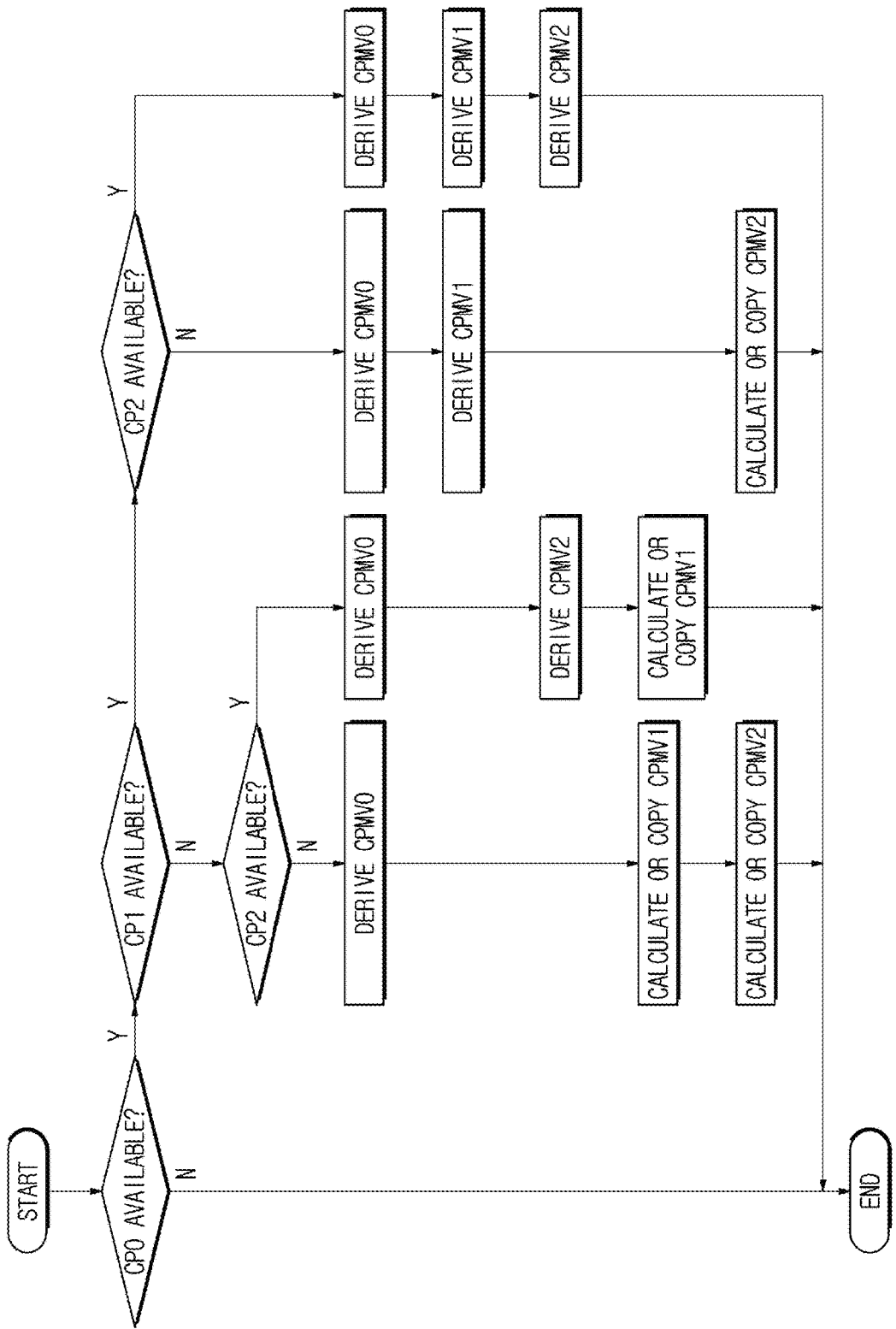
FIG. 39 is another view illustrating a CPMV derivation method according to an embodiment of the present disclosure.

FIGS. 37 to 39 are views illustrating CPMV derivation methods according to some embodiments of the present disclosure.

FIGS. 37 and 38 show a method of deriving a CPMV for a current block based on availability of a CP. The embodiments of FIGS. 37 and 38 may be performed for each reference picture list and may be repeated until the CPMV is derived for all reference picture lists.

When CP0, CP1 and CP2 are all available, a motion vector at each CP position may be determined to be a CPMV.

Next, when CP0, CP1 and CP2 are not all available but CP0 and CP1 are available, the motion vectors of CP0 and CP1 may be determined to be CPMV0 and CPMV1. In this case, the motion vector of CP2 may be set to the same value as the motion vector of CP0 or derived based on the motion vector of CP0 and/or CP1. In the following description, CPMV[N] [0] and CPMV[N] [1] may specify the x component value and y component value of an N-th CPMV. For example, CPMV2 may be derived according to Equation 5 below.

$$CPMV[2][0]=((CPMV[0][0]<<7)+((CPMV[1][1]-CPMV[0][1])<<(7+\text{Log2}(cb\text{Height}/cb\text{Width}))))>>7$$

$$CPMV[2][1]=((CPMV[0][1]<<7)+((CPMV[1][0]-CPMV[0][0])<<(7+\text{Log2}(cb\text{Height}/cb\text{Width}))))>>7 \quad \text{[Equation 5]}$$

Next, when CP0 and CP1 are not available but CP0 and CP2 are available, the motion vectors of CP0 and CP2 may be determined to be CPMV0 and CPMV2. In this case, the motion vector of CP1 may be set to the same value as the motion vector of CP0 or derived based on the motion vectors of CP0 and/or CP2. For example, CPMV1 may be derived according to Equation 6 below.

$$CPMV[1][0]=((CPMV[0][0]<<7)+((CPMV[2][1]-CPMV[0][1])<<(7+\text{Log2}(cb\text{Height}/cb\text{Width}))))>>7$$

$$CPMV[1][1]=((CPMV[0][1]<<7)+((CPMV[2][0]-CPMV[0][0])<<(7+\text{Log2}(cb\text{Height}/cb\text{Width}))))>>7 \quad \text{[Equation 6]}$$

According to FIG. 38, when CP0 and CP2 are not available but CP1 and CP2 are available, a CPMV may be derived according to one of the following methods. For example, the motion vector of CP2 may be determined to be CPMV0, CPMV1 and CPMV2. As another example, the motion vector of CP1 may be determined to be CPMV0, CPMV1 and CPMV2. As another example, the motion vectors of CP1 and CP2 may be determined to be CPMV1 and CPMV2, and CPMV0 may be derived based on the motion vectors of CP1 and/or CP2. For example, CPMV0 may be derived according to Equation 7 below.

$$CPMV[0][0]=((((CPMV[2][0]+CPMV[1][0])<<(7+\text{Log2}(cb\text{Height}/cb\text{Width}))+((CPMV[1][1]-CPMV[2][1])<<(7+\text{Log2}(cb\text{Height}/cb\text{Width})))>>1)>>7$$

$$CPMV[0][1]=((((CPMV[2][0]-CPMV[1][0])<<(7+\text{Log2}(cb\text{Height}/cb\text{Width}))+((CPMV[1][1]+CPMV[2][1])<<(7+\text{Log2}(cb\text{Height}/cb\text{Width})))>>1)>>7 \quad \text{[Equation 7]}$$

Next, when only one CP of CP0, CP1 and CP2 is available, a CPMV may be derived using the motion vector of the available CP. For example, when CP2 is available, the motion vector of CP2 may be determined to be CPMV0 and CPMV1. When CP1 is available, the motion vector of CP1 may be determined to be CPMV0 and CPMV2. When CP0 is available, the motion vector of CP0 may be determined to be CPMV1 and CPMV2.

Meanwhile, when all CPs are not available, the affine TMVP mode may not apply to the current block.

Referring to FIG. 39, determination of availability of the CP may be performed in order of CP0, CP1 and CP2. The motion vector for an unavailable CP may be derived using the motion vector of an available CP as described with reference to FIGS. 37 and 38. The order of determination of availability according to FIGS. 37 to 39 is exemplary and is not limited by the order proposed by the scope of the present disclosure.

Embodiment 7

Affine Model Type Determination Method

Hereinafter, a method of determining an affine model type according to an embodiment of the present disclosure will be described in detail. When all three CPs are available in the CPMV derivation process, the affine model type may be determined to be a 6-parameter model. In contrast, when three CPs are not all available, the affine model type may be determined to be a 4-parameter model.

Meanwhile, the affine model type may be determined for each reference picture list. In the case of a block for which bi-prediction is performed, if the affine model of even one direction is a 6-parameter model, the affine model type for the corresponding block may be determined to be a 6-parameter model. That is, in the case of a bi-prediction block, only when the affine model types of both directions are 4-parameter models, the affine model type for the corresponding block may be determined to be a 4-parameter model.

For example, the affine model type of the current block may be determined according to the bitstream structure of [Table 1] below. In the following description, a syntax element affineType[LX] may specify an affine model type of an LX prediction direction, and syntax elements AFFINEMODEL_6PARAM and AFFINEMODEL_4PARAM may respectively specify a 6-parameter model and a 4-parameter model.

TABLE 1

```
if((affineType[L0] == AFFINEMODEL_6PARAM) ||
(affineType[L1] == AFFINEMODEL_6PARAM))
    affineType = AFFINEMODEL_6PARAM
else
    affineType = AFFINEMODEL_4PARAM
```

As another example, when the number of available CPs of the current block is 3, the affine model type of the current block may be determined to be a 6-parameter model without distinguishing the reference picture list. In contrast, when the number of available CPs of the current block is 2, the affine model type of the current block may be determined to be a 4-parameter model without distinguishing the reference picture list.

As another example, regardless of availability of a coding parameter or CP, the affine model type may be preset to a 4-parameter model or a 6-parameter model. In this case, the affine model may be preset based on at least one of a sequence, a picture, a slice, a tile, a tile group or a brick.

Embodiment 8

Method of Generating Affine TMVP Candidate List

Figure 40:
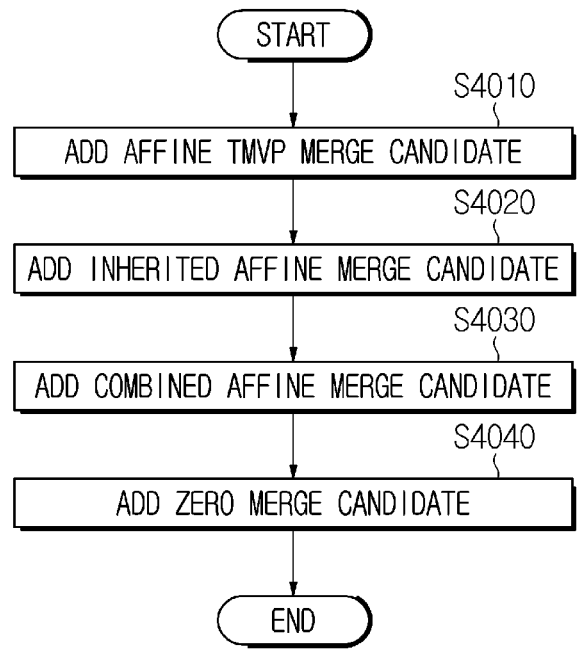
FIGS. 40 to 42 are views illustrating methods of deriving a subblock-based merge candidate list according to some embodiments of the present disclosure.
Figure 41:
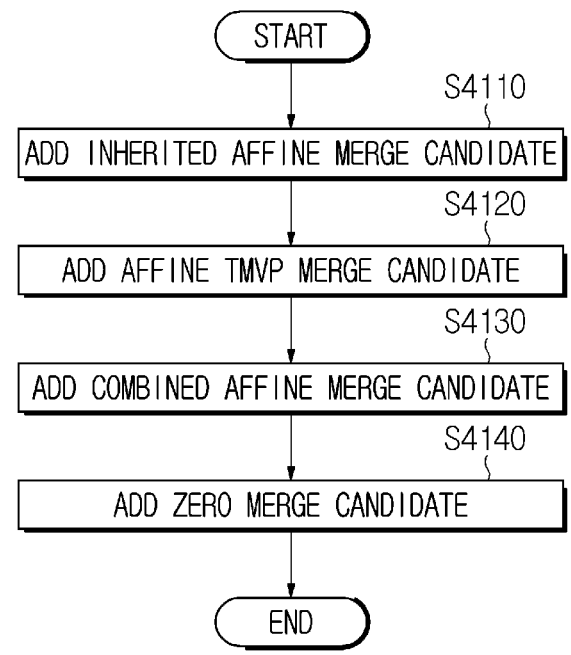
Figure 42:
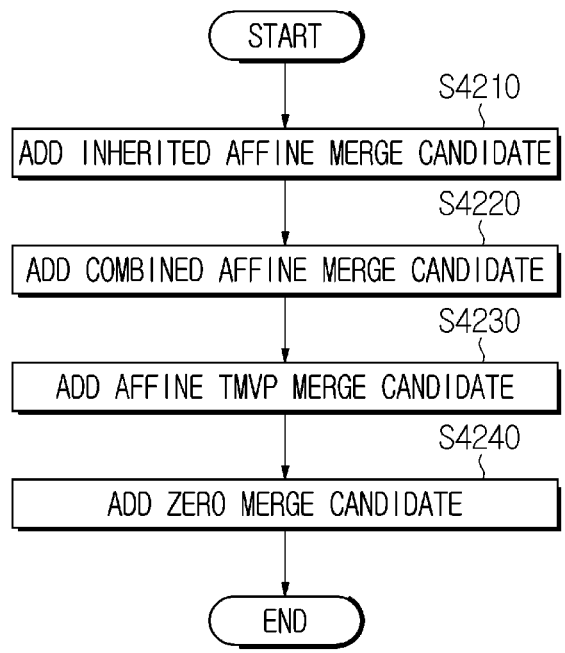

FIGS. 40 to 42 are views illustrating methods of deriving a subblock-based merge candidate list according to some embodiments of the present disclosure.

As described above, since the affine TMVP mode replaces a subblock-based TMVP mode, the affine TMVP merge candidate may be first added to the subblock unit merge candidate list. FIG. 40 shows an example in which the affine TMVP merge candidate list is first added to the subblock unit merge candidate list (S4010). As another example, according to FIG. 41, after the addition of the inherited affine merge candidate (S4110), the affine TMVP merge candidate may be added to the subblock unit merge candidate list (S4120). As another example, according to FIG. 42, after the addition of the combined affine merge candidate (S4220), the affine TMVP merge candidate may be added to the subblock unit merge candidate list (S4230).

In particular, according to the embodiments of FIGS. 41 and 42 in which the affine TMVP merge candidate is added before and after the combined affine merge candidate, since determination of availability of adjacent blocks for configuring the combined affine merge candidate may be used to add the affine TMVP merge candidate, encoding/decoding complexity may be reduced. In addition, since determination of availability may be performed based on a candidate having a plurality of block information instead of a single neighboring block, performance of the affine TMVP mode may be improved.

Embodiment 9

Application Range of Affine TMVP Mode

The affine TMVP modes of Embodiments 1 to 8 described above may be used to configure the conventional affine merge candidate list and/or affine MVP candidate list. That is, the affine TMVP merge candidate may configure the affine MVP candidate list along with the inherited affine MVP candidate and the combined affine MVP candidate added to the affine MVP candidate list. In this case, the affine TMVP merge candidate may be referred to as an affine TMVP candidate. As described with reference to Embodiment 8, the affine TMVP candidate may be added after the inherited affine MVP candidate or the combined affine MVP candidate. In addition, the maximum number of candidates of the affine MVP candidate list and the number of candidates for each candidate type may be adjusted according to the addition of the affine TMVP candidate.

Embodiment 10

Constraints of Affine TMVP Mode

Hereinafter, some constraints which will apply to the above-described affine TMVP mode will be described.

Figure 43:
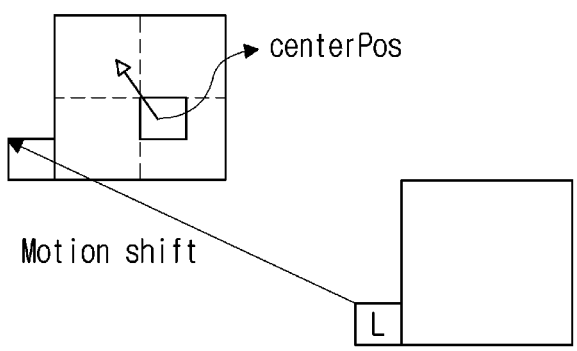
FIG. 43 is a view illustrating a constraint of an affine TMVP mode according to an embodiment of the present disclosure.

FIG. 43 is a view illustrating a constraint of an affine TMVP mode according to an embodiment of the present disclosure.

For example, a center position of a collocated block derived using a motion shift may be defined. In this case, when the center position is not available, application of the affine TMVP mode to the current block may be limited or skipped.

As another example, only when the reference picture indices of the CPs derived during application of the affine TMVP mode are the same, the affine TMVP mode may apply to the current block. For example, when the reference picture indices of three derived CPs are the same or the reference picture indices of two CPs are the same, the affine TMVP mode may apply to the current block.

As another example, when the motion vectors of the CPs derived during application of the affine TMVP mode are the same, application of the affine TMVP mode may be limited or skipped. For example, when three CPs are available and the motion vectors of the corresponding CPs are the same or when two CPs are available and the motion vectors of the corresponding CPs are the same, application of the affine TMVP mode to the current block may be limited or skipped.

As another example, when the motion vectors of the CPs derived during application of the affine TMVP mode are similar, application of the affine TMVP mode may be limited or skipped. For example, when three CPs are available and all differences between motion vectors are less than a preset value or when two CPs are available and a difference between the motion vectors is less than a preset value, application of the affine TMVP mode to the current block may be limited or skipped. For example, when the value of (CPMV0-CPMV1) and/or (CPMV0-CPMV2) is less than a preset value, application of the affine TMVP mode to the current block may be limited or skipped. For example, the preset value may be one pixel value.

As another example, a block to which bi-prediction applies may be limited such that only uni-prediction applies according to the number of available CPs of a bidirectional reference picture list. For example, when two or more CPs of a first reference picture list are available and only one CP of a second reference picture list is available or when two or more CPs of a second reference picture list are available and only one CP of a first reference picture list is available, the affine TMVP mode may apply to the current block through uni-prediction using only a reference picture list (in the reference direction) in which two or more available CPs are present.

As another example, when only one available CP is present, application of the affine TMVP mode to the current block may be limited or skipped.

As another example, when only one available CP is present, values of CPMV0, CPMV1 and/or CPMV2 may be determined to be the value of the motion vector of the center position of the collocated block. In this case, the motion vector of the center position may be defined as a default vector.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 44:
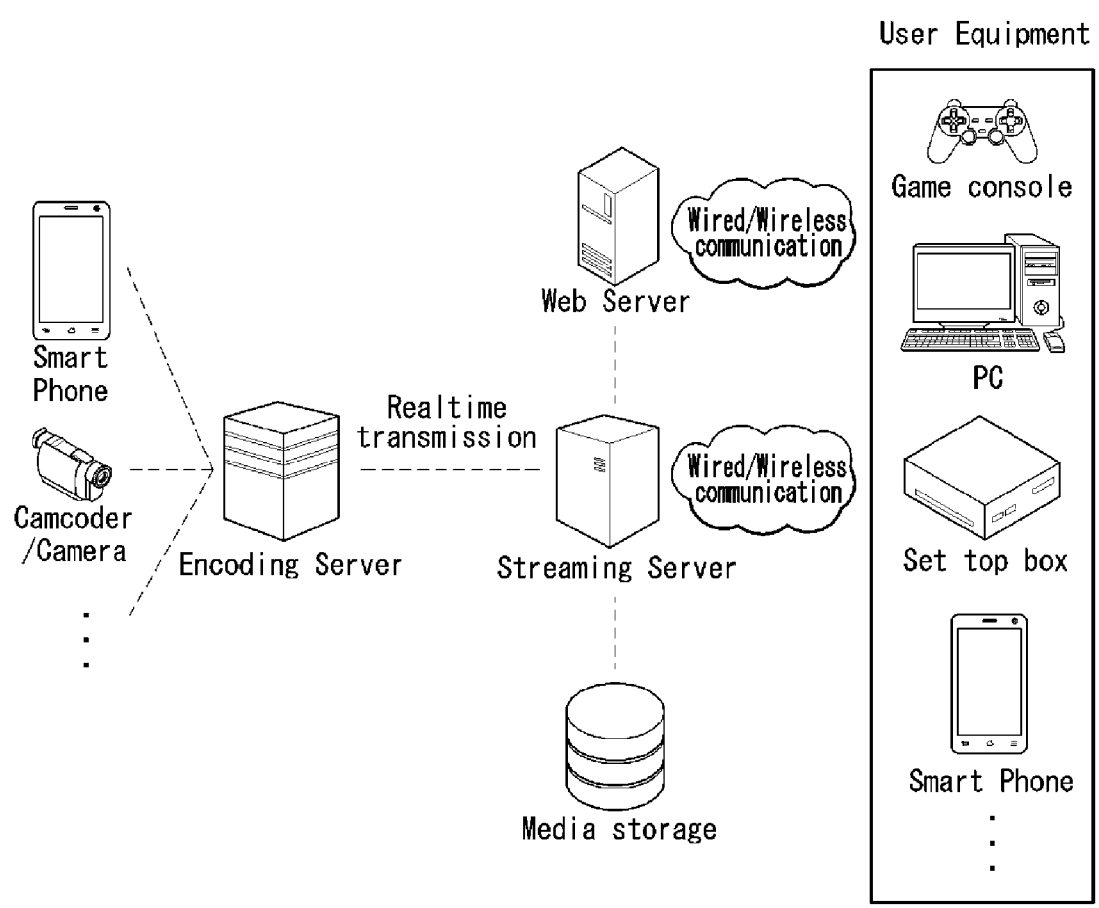
FIG. 44 is a view showing a content streaming system, to which an embodiment of the present disclosure is applicable.

FIG. 44 is a view showing a content streaming system, to which an embodiment of the present disclosure is applicable.

As shown in FIG. 44, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:

deriving a motion shift of a current block using motion vector of a neighboring block of the current block;

determining a collocated block of the current block using the motion shift;

deriving a motion vector for at least one control point (CP) of the determined collocated block; and deriving at least one control point motion vector (CPMV) of the current block using the motion vector for the at least one CP, wherein the deriving the motion vector for the at least one CP of the determined collocated block comprises:

determining availability of a first CP, a second CP and a third CP of the determined collocated block; and deriving a motion vector for at least one of the first CP, the second CP or the third CP based on the determination of availability, wherein availability of the at least one CP is determined based on whether an intra prediction mode or an intra block copy (IBC) mode applies to a block including coordinates of the at least one CP.

2. The image decoding method of claim 1, wherein the neighboring block is a left neighboring block of the current block.

3. The image decoding method of claim 1, further comprising determining whether an affine temporal motion vector predictor (TMVP) mode applies to the current block, wherein whether the affine TMVP mode applies to the current block may be determined based on first information specifying whether derivation of a temporal candidate is enabled with respect to the current block.

4. The image decoding method of claim 3, further comprising determining an affine model type of the affine TMVP mode when the affine TMVP mode applies to the current block, wherein the affine model type is determined to be one of a 4-parameter model and a 6-parameter model.

5. The image decoding method of claim 4, wherein, when bi-prediction is performed with respect to the current block and at least one of affine model types of a first prediction direction and a second prediction direction of the bi-prediction is a 6-parameter model, the affine model type of the affine TMVP mode is determined to be a 6-parameter model.

6. The image decoding method of claim 3, further comprising determining availability of a center position block of the determined collocated block, wherein, when the center position block is not available, the affine TMVP mode does not apply to the current block.

7. The image decoding method of claim 1, further comprising:

deriving an affine TMVP candidate for the current block using the derived at least one CPMV; and deriving a subblock unit merge candidate list for the current block using the affine TMVP candidate.

8. The image decoding method of claim 7, wherein the subblock unit merge candidate list comprises at least one of the affine TMVP candidate, an inherited affine merge candidate, a combined affine merge candidate or a zero merge candidate, and wherein the affine TMVP candidate is first added to the subblock unit merge candidate list.

9. The image decoding method of claim 1, wherein, when one unavailable CP is present as a result of the determination of availability, a motion vector of the unavailable CP is derived using at least one of the motion vectors of the remaining available CPs.

10. The image decoding method of claim 1, wherein the motion shift is derived for each neighboring block using motion vector of a plurality of neighboring blocks of the current block, wherein the collocated block is determined one by one for each derived motion shift, and wherein the motion vector for the at least one CP is derived using a CP of the determined collocated block for each motion shift.

11. An image decoding apparatus comprising:

a memory; and at least one processor, wherein the at least one processor configured to:

derive a motion shift of a current block using motion vector of a neighboring block of the current block, determine a collocated block of the current block using the motion shift, derive a motion vector for at least one control point (CP) of the determined collocated block, and derive at least one control point motion vector (CPMV) of the current block using the motion vector for the at least one CP, wherein the at least one processor, to derive the motion vector for the at least one CP of the determined collocated block, further configured to:

determine availability of a first CP, a second CP and a third CP of the determined collocated block; and derive a motion vector for at least one of the first CP, the second CP or the third CP based on the determination of availability, wherein availability of the at least one CP is determined based on whether an intra prediction mode or an intra block copy (IBC) mode applies to a block including coordinates of the at least one CP.

12. An image encoding method performed by an image encoding apparatus, the image encoding method comprising:

deriving a motion shift of a current block using motion vector of a neighboring block of the current block;

determining a collocated block of the current block using the motion shift;

deriving a motion vector for at least one control point (CP) of the determined collocated block; and deriving at least one control point motion vector (CPMV) of the current block using the motion vector for the at least one CP, wherein the deriving the motion vector for the at least one CP of the determined collocated block comprises:

determining availability of a first CP, a second CP and a third CP of the determined collocated block; and deriving a motion vector for at least one of the first CP, the second CP or the third CP based on the determination of availability, wherein availability of the at least one CP is determined based on whether an intra prediction mode or an intra block copy (IBC) mode applies to a block including coordinates of the at least one CP.

13. A method of transmitting a bitstream comprising:

generating the bitstream based on an image encoding method; and transmitting the bitstream, wherein the image encoding method comprises:

deriving a motion shift of a current block using motion vector of a neighboring block of the current block;

determining a collocated block of the current block using the motion shift;

deriving a motion vector for at least one control point
(CP) of the determined collocated block; and
deriving at least one control point motion vector (CPMV)
of the current block using the motion vector for the at
least one CP,
wherein the deriving the motion vector for the at least one
CP of the determined collocated block comprises:
determining availability of a first CP, a second CP and a
third CP of the determined collocated block; and
deriving a motion vector for at least one of the first CP, the
second CP or the third CP based on the determination
of availability,
wherein availability of the at least one CP is determined
based on whether an intra prediction mode or an intra
block copy (IBC) mode applies to a block including
coordinates of the at least one CP.

* * * * *